United States Patent
Shikata et al.

(10) Patent No.: US 11,637,803 B2
(45) Date of Patent: Apr. 25, 2023

(54) SWITCH DEVICE AND COMMUNICATION CONTROL METHOD

(71) Applicants: Sumitomo Electric Industries, Ltd., Osaka (JP); AUTONETWORKS TECHNOLOGIES, LTD., Yokkaichi (JP); SUMITOMO WIRING SYSTEMS, LTD., Yokkaichi (JP)

(72) Inventors: Hayato Shikata, Osaka (JP); Hirofumi Urayama, Osaka (JP); Hideki Maeda, Osaka (JP); Yasuhiro Yabuuchi, Yokkaichi (JP); Takeshi Hagihara, Yokkaichi (JP)

(73) Assignees: Sumitomo Electric Industries, Ltd., Osaka (JP); AutoNetworks Technologies, Ltd., Yokkaichi (JP); Sumitomo Wiring Systems. Ltd., Yokkaichi (JP)

( * ) Notice: Subject to any disclaimer, the term of this patent is extended or adjusted under 35 U.S.C. 154(b) by 8 days.

(21) Appl. No.: 16/497,222

(22) PCT Filed: Mar. 9, 2018

(86) PCT No.: PCT/JP2018/009186
§ 371 (c)(1),
(2) Date: Sep. 24, 2019

(87) PCT Pub. No.: WO2018/173799
PCT Pub. Date: Sep. 27, 2018

(65) Prior Publication Data
US 2020/0021557 A1    Jan. 16, 2020

(30) Foreign Application Priority Data

Mar. 24, 2017    (JP) .............................. JP2017-059593

(51) Int. Cl.
*H04L 61/2517* (2022.01)
*H04L 49/00* (2022.01)
*H04L 45/74* (2022.01)

(52) U.S. Cl.
CPC .......... *H04L 61/2517* (2013.01); *H04L 45/74* (2013.01); *H04L 49/30* (2013.01)

(58) Field of Classification Search
None
See application file for complete search history.

(56) References Cited

U.S. PATENT DOCUMENTS 6,175,874 B1 * 1/2001 Imai ...................... H04L 45/745
709/205
7,016,352 B1 * 3/2006 Chow ................... H04L 49/604
370/413

(Continued)

FOREIGN PATENT DOCUMENTS

JP    H06-268648 A    9/1994
JP    2002-281071 A1    9/2002

(Continued)

OTHER PUBLICATIONS

International Preliminary Report on Patentability issued in International Application No. PCT/JP2018/009186 dated Jan. 8, 2019.

(Continued)

*Primary Examiner* — Christopher T Wyllie
(74) *Attorney, Agent, or Firm* — Baker Botts, L.L.P.; Michael A. Sartori

(57) ABSTRACT

A switch device for relaying flow data in an in-vehicle network, being equipped with an acquiring section for acquiring correspondence information indicating at least a correspondence relationship among a transmission destination IP address, a transmission source IP address, transmission destination port information, transmission source port information and a transmission destination MAC address (Continued)

and a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address.

10 Claims, 21 Drawing Sheets

(56) References Cited

U.S. PATENT DOCUMENTS

| | | | |
|---|---|---|---|
| 7,505,472 B1* | 3/2009 | Becker Hof | H04L 12/413 370/466 |
| 9,047,329 B1* | 6/2015 | Tyson | G06F 16/2255 |
| 9,407,537 B1* | 8/2016 | Shekhar | H04L 69/14 |
| 2002/0016860 A1* | 2/2002 | Garcia-Luna-Aceves | G06F 12/1483 709/214 |
| 2003/0147405 A1* | 8/2003 | Khill | H04L 41/16 370/402 |
| 2003/0223421 A1* | 12/2003 | Rich | H04L 49/3009 711/216 |
| 2005/0198468 A1* | 9/2005 | Rubin | G06F 8/443 712/22 |
| 2005/0213582 A1* | 9/2005 | Wakumoto | H04L 47/125 370/395.3 |
| 2008/0028055 A1* | 1/2008 | Dolev | G06F 9/546 709/222 |
| 2010/0135307 A1* | 6/2010 | Nakagawa | H04L 49/354 370/395.53 |
| 2010/0290474 A1* | 11/2010 | Kaippallimalil | H04L 12/4666 370/395.53 |
| 2011/0273987 A1* | 11/2011 | Schlansker | H04L 45/00 370/235 |
| 2012/0163382 A1* | 6/2012 | Nors | H04L 12/2878 370/392 |
| 2013/0176861 A1 | 7/2013 | Akiyoshi | |
| 2013/0230047 A1* | 9/2013 | Subrahmaniam | H04L 47/2441 370/392 |
| 2014/0105215 A1* | 4/2014 | Mogul | H04L 49/356 370/395.32 |
| 2014/0334491 A1* | 11/2014 | Pazhayakath | H04L 45/38 370/392 |
| 2015/0263970 A1* | 9/2015 | Macchiano | H04L 45/22 709/223 |
| 2016/0241474 A1* | 8/2016 | Wang | H04L 45/54 |
| 2016/0261611 A1* | 9/2016 | Heilig | H04L 63/1425 |
| 2017/0105142 A1* | 4/2017 | Hecht | H04L 69/08 |
| 2018/0139131 A1* | 5/2018 | Ignatchenko | H04L 43/10 |
| 2018/0167307 A1* | 6/2018 | Barry | H04L 45/38 |
| 2018/0203942 A1* | 7/2018 | Liu | G06F 16/90335 |
| 2020/0220838 A1* | 7/2020 | Ogawa | H04L 12/28 |

FOREIGN PATENT DOCUMENTS

| | | |
|---|---|---|
| JP | 2008-005008 A | 1/2008 |
| JP | 2008-505561 A | 2/2008 |
| JP | 2013-168865 A | 8/2013 |
| JP | 2013-541235 A | 11/2013 |
| JP | 2015-2437 A | 1/2015 |
| JP | 2016-58803 A | 4/2016 |
| JP | 2017-5617 A | 1/2017 |
| NO | 2006/005029 A1 | 1/2006 |
| WO | 2011/078108 A1 | 6/2011 |

OTHER PUBLICATIONS

Keita Suzuki, "Modern layer 3 switches for beginners", Network, Mar. 28, 2015, No. 180, pp. 56-63 (in particular, p. 60, footnote). [Cited in International Preliminary Report on Patentability issued in International Application No. PCT/JP2018/009186 dated Jan. 8, 2019.].

* cited by examiner

FIG. 7

Tab1

| TRANSMISSION DESTINATION MAC ADDRESS | OUTPUT DESTINATION (LOGIC PORT NUMBER) |
|---|---|
| MAC-DA0 | 0 |
| MAC-DA1 | 1 |
| MAC-DA2 | 2 |
| MAC-DA3 | 3 |
| MAC-DA4 | 4 |
| MAC-DA5 | 5 |
| MAC-DA6 | 6 |
| MAC-DA8 | 8 |

FIG. 8

| TRANSMISSION DESTINATION IP ADDRESS | TRANSMISSION SOURCE IP ADDRESS | COMMUNICATION PROTOCOL | TRANSMISSION DESTINATION PORT NUMBER | TRANSMISSION SOURCE PORT NUMBER | TRANSMISSION DESTINATION MAC ADDRESS | TRANSMISSION SOURCE MAC ADDRESS |
|---|---|---|---|---|---|---|
| IP-DA1 | IP-SA1 | TCP/UDP | Dst-Port1 | Src-Port1 | MAC-DA1 | MAC-SA1 |
| IP-DA2 | IP-SA2 | TCP/UDP | Dst-Port2 | Src-Port2 | MAC-DA2 | MAC-SA2 |
| ⋯ | ⋯ | ⋯ | ⋯ | ⋯ | ⋯ | ⋯ |
| IP-DAn | IP-SAn | TCP/UDP | Dst-Portn | Src-Portn | MAC-DAn | MAC-SAn |

Tab2

FIG.9

| HASH VALUE | TRANSMISSION DESTINATION MAC ADDRESS | TRANSMISSION SOURCE MAC ADDRESS |
|---|---|---|
| Hash1 | MAC-DA1 | MAC-SA1 |
| Hash2 | MAC-DA2 | MAC-SA2 |
| ⋮ | ⋮ | ⋮ |
| Hashn | MAC-DAn | MAC-SAn |

Tab3

FIG. 16

| TRANSMISSION DESTINATION IP ADDRESS | TRANSMISSION SOURCE IP ADDRESS | COMMUNICATION PROTOCOL | TRANSMISSION DESTINATION PORT NUMBER | TRANSMISSION SOURCE PORT NUMBER | TIME STAMP |
|---|---|---|---|---|---|
| IP-DA1 | IP-SA1 | TCP/UDP | Dst-Port1 | Src-Port1 | time1 |
| IP-DA2 | IP-SA2 | TCP/UDP | Dst-Port2 | Src-Port2 | time2 |
| IP-DA3 | IP-SA3 | TCP/UDP | Dst-Port3 | Src-Port3 | time3 |

Lst1

FIG. 19

| TRANSMISSION DESTINATION IP ADDRESS | TRANSMISSION SOURCE IP ADDRESS | COMMUNICATION PROTOCOL | TRANSMISSION DESTINATION PORT NUMBER | TRANSMISSION SOURCE PORT NUMBER | TRANSMISSION DESTINATION MAC ADDRESS | TRANSMISSION SOURCE MAC ADDRESS | STATE |
|---|---|---|---|---|---|---|---|
| IP-DA1 | IP-SA1 | TCP/UDP | Dst-Port1 | Src-Port1 | MAC-DA1 | MAC-SA1 | 有効 |
| IP-DA2 | IP-SA2 | TCP/UDP | Dst-Port2 | Src-Port2 | MAC-DA2 | MAC-SA2 | 無効 |
| ... | ... | ... | ... | ... | ... | ... | ... |
| IP-DAn | IP-SAn | TCP/UDP | Dst-Portn | Src-Portn | MAC-DAn | MAC-SAn | 無効 |

Tab4

FIG. 21

| HASH VALUE | TRANSMISSION DESTINATION MAC ADDRESS | TRANSMISSION SOURCE MAC ADDRESS | STATE |
|---|---|---|---|
| Hash1 | MAC-DA1 | MAC-SA1 | 有効 |
| Hash2 | MAC-DA2 | MAC-SA2 | 無効 |
| ⋮ | ⋮ | ⋮ | ⋮ |
| Hashn | MAC-DAn | MAC-SAn | 無効 |

Tab5

SWITCH DEVICE AND COMMUNICATION CONTROL METHOD

CROSS-REFERENCE TO RELATED APPLICATIONS

This application is the national phase under 35 U. S. C. § 371 of PCT International Application No. PCT/JP2018/009186 which has an International filing date of Mar. 9, 2018 and designated the United States of America.

FIELD

The present disclosure relates to a switch device, a communication control method and a communication control program.

This application claims the priority based on Japanese Patent Application No. 2017-59593 filed on Mar. 24, 2017, and its disclosure is incorporated herein in its entirety.

BACKGROUND

Patent document 1 (Japanese Patent Application Laid-Open Publication No. 2013-168865) discloses the following in-vehicle network system. In other words, the in-vehicle network system is equipped with an in-vehicle control device having a memory for storing definition data defining portions that are included in communication protocols for use on an in-vehicle network and depend on implementation on the in-vehicle network and a communication protocol issuing device for issuing the definition data to the in-vehicle control device.

Upon receiving a registration request requesting to make the in-vehicle control device participate in the in-vehicle network from a registration device for making the in-vehicle control device participate in the in-vehicle network, the communication protocol issuing device performs authentication to the registration device, creates the definition data conforming to the implementation on the in-vehicle network and transmits the definition data to the registration device as a reply. The registration device receives the definition data transmitted by the communication protocol issuing device and requests the in-vehicle control device to store the received definition data on the memory. After that, the in-vehicle control device receives the definition data from the registration device, stores the definition data on the memory, and performs communication using the in-vehicle network according to the portions defined by the definition data while conforming to the communication protocols.

SUMMARY (1) A switch device according to this disclosure is a switch device for relaying flow data in an in-vehicle network, being equipped with an acquiring section for acquiring correspondence information indicating at least a correspondence relationship among a transmission destination IP (Internet Protocol) address, a transmission source IP address, transmission destination port information, transmission source port information and a transmission destination MAC (Media Access Control) address and a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address.

(2) A switch device according to this disclosure is a switch device for relaying flow data in an in-vehicle network, being equipped with an acquiring section for acquiring correspondence information indicating at least a correspondence relationship between a transmission destination MAC address and a value uniquely determining a transmission destination IP address, a transmission source IP address, transmission destination port information and transmission source port information and a relay section for acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and for performing transmission processing to transmit the frame including the acquired transmission destination MAC address.

(10) A communication control method according to this disclosure is a communication control method in a switch device for relaying flow data in an in-vehicle network, including a step of acquiring correspondence information indicating at least a correspondence relationship among a transmission destination IP address, a transmission source IP address, transmission destination port information, transmission source port information and a transmission destination MAC address and a step of acquiring the transmission destination MAC address from the correspondence information on the basis of the transmission destination IP address, the transmission source IP address, the transmission destination port information and the transmission source port information included in a frame that is received by the switch device and constitutes the flow data and then performing transmission processing to transmit the frame including the acquired transmission destination MAC address.

(11) A communication control method according to this disclosure is a communication control method in a switch device for relaying flow data in an in-vehicle network, including a step of acquiring correspondence information indicating at least a correspondence relationship between a transmission destination MAC address and a value uniquely determining a transmission destination IP address, a transmission source IP address, transmission destination port information and transmission source port information and a step of acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and then performing transmission processing to transmit the frame including the acquired transmission destination MAC address.

(12) A communication control program according to this disclosure is a communication control program for use in a switch device for relaying flow data in an in-vehicle network and for making a computer function as an acquiring section for acquiring correspondence information indicating at least a correspondence relationship among a transmission destination IP address, a transmission source IP address, transmission source port information and a transmission destination MAC address and as a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address.

(13) A communication control program according to this disclosure is a communication control program for use in a switch device for relaying flow data in an in-vehicle network and for making a computer function as an acquiring section for acquiring correspondence information indicating at least a correspondence relationship between a transmission destination MAC address and a value uniquely determining a transmission destination IP address, a transmission source IP address, transmission destination port information and transmission source port information and as a relay section for acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and for performing transmission processing to transmit the frame including the acquired transmission destination MAC address.

An embodiment of this disclosure can be achieved not only as the switch device equipped with these characteristic processing sections but also as an in-vehicle communication system equipped with the switch device. Furthermore, the embodiment of this disclosure can be achieved as a semiconductor integrated circuit achieving part or the whole of the switch device.

The above and further objects and features will more fully be apparent from the following detailed description with accompanying drawings.

BRIEF DESCRIPTION OF THE DRAWINGS

FIG. 7 is a view showing an example of an ARL table that is used in a switching section according to the first embodiment of the present disclosure;

FIG. 8 is a view showing an example of a conversion table stored in the storage section in the switch device according to the first embodiment of the present disclosure;

FIG. 9 is a view showing an example of a conversion table stored in the storage section in a modification example of the switch device according to the first embodiment of the present disclosure;

FIG. 16 is a view showing an example of a flow list stored in the storage section in the comparison example of the switch device according to the first embodiment of the present disclosure;

FIG. 19 is a view showing an example of a conversion table stored in the storage section in the switch device according to the second embodiment of the present disclosure;

FIG. 21 is a view showing an example of a conversion table stored in the storage section in the modification example of the switch device according to the second embodiment of the present disclosure.

DETAILED DESCRIPTION

Figure 1:
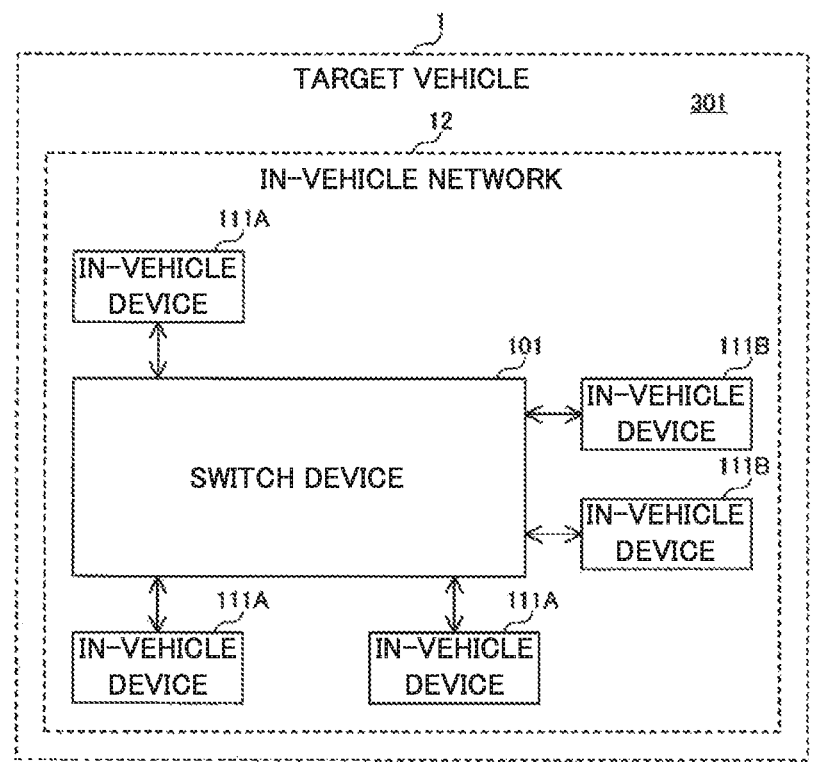
FIG. 1 is a view showing a configuration of an in-vehicle communication system according to a first embodiment of the present disclosure.

Conventionally, in-vehicle network systems for improving security in in-vehicle networks have been developed.

The in-vehicle network described in Patent Document 1 is provided with a communication gateway for relaying information transmitted from the in-vehicle control device.

For example, as a configuration of the communication gateway, a configuration equipped with an L2 switch for performing layer 2 (L2) relay processing and an MPU (Micro Processing Unit) for performing layer 3 (L3) relay processing is conceivable.

In this configuration, for example, in the case that the speed of the L2 switch is raised, the transmission of frames to be relayed at the L2 level is performed at high speed. However, in the case that the speed of the MPU is not raised, the transmission of IP packets to be relayed at the L3 level is not performed at high speed, whereby the benefit of the high speed at the L2 level cannot be enjoyed in IP (Internet Protocol) communication between an external device outside the vehicle and an in-vehicle device.

This disclosure is intended to solve the above-mentioned problems, and an object thereof is to provide a switch device, a communication control method and a communication control program capable of efficiently performing the relay processing of IP packets in an in-vehicle network.

With this disclosure, the relay processing of IP packets in an in-vehicle network can be performed efficiently.

First, the contents of embodiments of the present disclosure will be listed and described.

(1) A switch device according to an embodiment of the present disclosure is a switch device for relaying flow data in an in-vehicle network, being equipped with an acquiring section for acquiring correspondence information indicating at least a correspondence relationship among a transmission destination IP address, a transmission source IP address, transmission destination port information, transmission source port information and a transmission destination MAC address and a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address.

With this configuration, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

(2) A switch device according to an embodiment of the present disclosure is a switch device for relaying flow data in an in-vehicle network, being equipped with an acquiring section for acquiring correspondence information indicating at least a correspondence relationship between a transmission destination MAC address and a value uniquely determining a transmission destination IP address, a transmission source IP address, transmission destination port information and transmission source port information and a relay section for acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and for performing transmission processing to transmit the frame including the acquired transmission destination MAC address.

As described above, with the configuration in which a value uniquely determining the transmission destination IP address, the transmission source IP address, the transmission destination port information and the transmission source port information is used, the correspondence information can be simplified. Furthermore, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

(3) Preferably, the switch device is further equipped with a storage section for fixedly storing the correspondence information.

For example, in an environment in which the network configuration of the switch device and the in-vehicle devices is fixed as described above, with the configuration in which the correspondence information indicating the predetermined correspondence relationship is fixedly stored, the transmission destination MAC address to be included in a frame can be acquired more efficiently than in a configuration in which the correspondence relationship is dynamically created each time a frame is received. Still further, since the overlap of values uniquely determining the transmission destination IP address, the transmission source IP address, the transmission destination port information and the transmission source port information can be checked preliminarily, appropriate correspondence information having no overlap in the values can be prepared.

(4) Preferably, the switch device is further equipped with an inspection section for performing inspection processing for the frames received by the switch device, wherein in a case that a first frame constituting the flow data has passed the inspection processing, the inspection section does not perform the inspection processing for the second and subsequent frames and the relay section performs the transmission processing for at least the second and subsequent frames.

With this configuration, security is ensured for the first frame, and the inspection processing is omitted for the second and subsequent frames in which security can be ensured, and then the transmission processing is performed, whereby layer 3 relay processing can be performed at high speed.

(5) Preferably, the switch device is further equipped with a switching section for switching whether the frames received by the switch device are output to the inspection section or to the relay section, wherein the switching section outputs the first frame to the inspection section, and in the case that the first frame has passed the inspection processing, the switching section outputs the second and subsequent frames to the relay section.

With this configuration, the received frames can be transmitted appropriately to one of the inspection section and the relay section according to the order of the frames in the flow data and the inspection results of the frames.

(6) Preferably, the switch device is further equipped with a first semiconductor integrated circuit and a second semiconductor integrated circuit, wherein the first semiconductor integrated circuit includes the inspection section, and the second semiconductor integrated circuit includes the relay section and the switching section and receives the frames from an outside and transmits the frames to the outside.

With this configuration, processing loads can be prevented from being concentrated on the first semiconductor integrated circuit that is, for example, formed of an MPU. What's more, for example, even in the case that the speed of the second semiconductor integrated circuit serving as an L2 switch is raised without raising the speed of the first semiconductor integrated circuit, most of L3 level processing can be performed in the second semiconductor integrated circuit, whereby IP communication between the external device and the in-vehicle device can be performed at high speed while suppressing the cost increase for raising the speed of the MPU.

(7) Preferably, the switch device is further equipped with a first semiconductor integrated circuit and a second semiconductor integrated circuit, wherein the first semiconductor integrated circuit includes the inspection section, the relay section and the switching section, and the second semiconductor integrated circuit receives the frames from an outside and transmits the frames to the outside.

With the above-mentioned configuration, L3 level processing, for example, can be performed concentratedly on the first semiconductor integrated circuit that is, for example, formed of an MPU, and the processing performed in the second semiconductor integrated circuit can be limited to L2 level processing, whereby a commercially available L2 switch integrated circuit can be directly used as the second semiconductor integrated circuit. Hence, IP communication between the external device and the in-vehicle device can be performed at high speed while suppressing the cost increase for the L2 switch.

(8) Preferably, the correspondence information indicates the correspondence relationship among the transmission destination IP address, the transmission source IP address, the transmission destination port information, the transmission source port information, a communication protocol and the transmission destination MAC address.

With this configuration, it is possible to distinguish types of flow data being identical in the transmission destination IP address, the transmission source IP address, the transmission destination port information and the transmission source port information but different in a communication protocol, whereby flow data relay processing can be managed meticulously.

(9) Preferably, the value is a value uniquely determining the transmission destination IP address, the transmission source IP address, the transmission destination port information, the transmission source port information and the communication protocol.

With this configuration, it is possible to distinguish types of flow data being identical in the transmission destination IP address, the transmission source IP address, the transmission destination port information and the transmission source port information but different in the communication protocol, whereby flow data relay processing can be managed meticulously.

(10) A communication control method according to an embodiment of the present disclosure is a communication control method in a switch device for relaying flow data in an in-vehicle network, including a step of acquiring correspondence information indicating at least a correspondence relationship among a transmission destination IP address, a transmission source IP address, transmission destination port information, transmission source port information and a transmission destination MAC address and a step of acquiring the transmission destination MAC address from the correspondence information on the basis of the transmission destination IP address, the transmission source IP address, the transmission destination port information and the transmission source port information included in a frame that is received by the switch device and constitutes the flow data and then performing transmission processing to transmit the frame including the acquired transmission destination MAC address.

With this configuration, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

(11) A communication control method according to an embodiment of the present disclosure is a communication control method in a switch device for relaying flow data in an in-vehicle network, including a step of acquiring correspondence information indicating at least a correspondence relationship between a transmission destination MAC address and a value uniquely determining a transmission destination IP address, a transmission source IP address, transmission destination port information and transmission source port information and a step of acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and then performing transmission processing to transmit the frame including the acquired transmission destination MAC address.

As described above, with the configuration in which a value uniquely determining the transmission destination IP address, the transmission source IP address, the transmission destination port information and the transmission source port information is used, the correspondence information can be simplified. Furthermore, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

(12) A communication control program according to an embodiment of the present disclosure is a communication control program for use in a switch device for relaying flow data in an in-vehicle network and for making a computer function as an acquiring section for acquiring correspondence information indicating at least a correspondence relationship among a transmission destination IP address, a transmission source IP address, transmission destination port information, transmission source port information and a transmission destination MAC address and as a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address.

With this configuration, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

(13) A communication control program according to an embodiment of the present disclosure is a communication control program for use in a switch device for relaying flow data in an in-vehicle network and for making a computer function as an acquiring section for acquiring correspondence information indicating at least a correspondence relationship between a transmission destination MAC address and a value uniquely determining a transmission destination IP address, a transmission source IP address, transmission destination port information and transmission source port information and as a relay section for acquiring, from the correspondence information, the transmission destination MAC address corresponding to a value, which is included in a frame that is received by the switch device and constitutes the flow data and which uniquely determines the transmission destination IP address, the transmission source IP address, the transmission destination port information and the transmission source port information of the frame, and for performing transmission processing to transmit the frame including the acquired transmission destination MAC address.

As described above, with the configuration in which a value uniquely determining the transmission destination IP address, the transmission source IP address, the transmission destination port information and the transmission source port information is used, the correspondence information can be simplified. Furthermore, the transmission destination MAC address can be acquired from the correspondence information more quickly than, for example, in the case that the subnet at the transmission destination of an IP packet is specified and that the transmission destination MAC address to be included in a frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

The embodiments of the present disclosure will be described below referring to the drawings. The same or equivalent components in the drawings are designated by the same reference numerals and signs, and the descriptions thereof are not repeated. Furthermore, at least portions of the embodiments described below may be combined arbitrarily.

First Embodiment

Configuration and Basic Operation

FIG. 1 is a view showing a configuration of an in-vehicle communication system according to a first embodiment of the present disclosure.

Referring to FIG. 1, a target vehicle 1 is provided with an in-vehicle communication system 301. The in-vehicle communication system 301 is equipped with a switch device 101, three in-vehicle devices 111A and two in-vehicle devices 111B. Each of the in-vehicle devices 111A and the in-vehicle devices 111B is hereafter also referred to as the in-vehicle device 111.

The switch device 101 is connected to the three in-vehicle devices 111A and the two in-vehicle devices 111B, whereby an in-vehicle network 12 is formed.

The in-vehicle devices 111 are, for example, a TCU (Telematics Communication Unit), an autonomous driving ECU (Electronic Control Unit), a camera, a radar device and a navigation device.

The TCU performs wireless communication with a wireless base station device according to a communication standard, such as LTE (Long Term Evolution) or 3G, thereby being capable of performing communication with a server or the like outside the target vehicle 1.

The autonomous driving ECU performs autonomous driving control for the target vehicle 1. The camera photographs an image or video around the target vehicle 1. The radar device is, for example, a millimeter-wave radar and detects objects around the target vehicle 1. The navigation device, for example, receives map information from a map server outside the target vehicle 1 via the TCU and displays a map indicating the received map information.

Between the in-vehicle devices 111, IP packets are transmitted and received according to communication protocols, such as IP/TCP (Transmission Control Protocol) and IP/UDP (User Datagram Protocol).

Furthermore, among the switch device 101 and the in-vehicle devices 111, Ethernet frames including IP packets are transmitted and received for example, according to the communication protocols of Ethernet (registered trademark).

In more detail, the switch device 101 relays IP packets to be transmitted and received between two in-vehicle devices 111.

For example, the in-vehicle devices 111A and 111B belong to subnets being different from each other. The switch device 101, functioning as an L3 switch for IP packets to be transmitted and received between an in-vehicle device 111A and an in-vehicle device 111B, relays the IP packets.

Moreover, the switch device 101, functioning as an L2 switch for IP packets to be transmitted and received between one in-vehicle device 111A and another in-vehicle device 111A and for IP packets to be transmitted and received between one in-vehicle device 111B and the other in-vehicle device 111B, relays the IP packets.

Configuration of an Ethernet Frame

Figure 2:
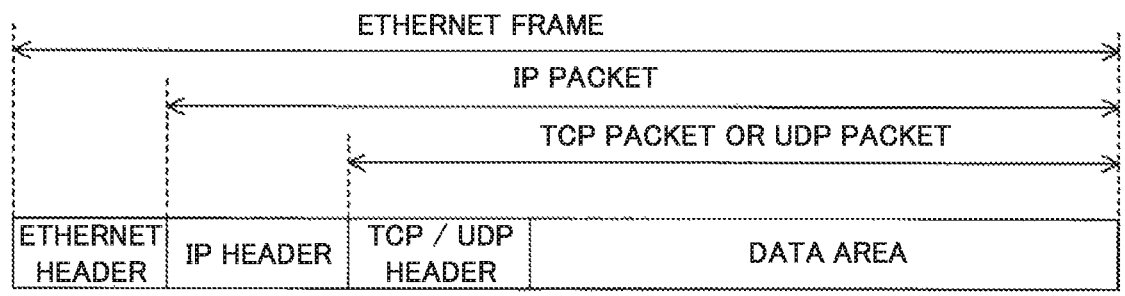
FIG. 2 is a view showing an example of a configuration of an Ethernet frame to be transmitted and received in an in-vehicle network according to the first embodiment of the present disclosure.

FIG. 2 is a view showing an example of a configuration of an Ethernet frame to be transmitted and received in the in-vehicle network according to the first embodiment of the present disclosure.

Referring to FIG. 2, the Ethernet frame includes an Ethernet header and one IP packet. The area including the IP packet in the Ethernet frame is the payload of the Ethernet frame.

The IP packet includes an IP header and one TCP packet or one UDP packet. The area including the TCP packet or the UDP packet in the IP packet is the payload of the IP packet.

The TCP packet or the UDP packet includes a TCP header or a UDP header and a data area. The data area in the TCP packet or the UDP packet is the payload of the TCP packet or the UDP packet.

The Ethernet header includes a transmission destination MAC (Media Access Control) address and a transmission source MAC address.

The IP header includes a transmission destination IP address and a transmission source IP address. Furthermore, the IP header includes a protocol number indicating the type of a communication protocol. For example, in the case of TCP, the communication protocol number thereof is 6. In the case of UDP, the communication protocol number thereof is 17. Moreover, the IP header includes a flag field and a flag offset field. The details of the flag field and the flag offset field will be described later.

The TCP header or the UDP header includes a transmission destination port number and a transmission source port number.

Flow Data

Referring again to FIG. 1, the switch device 101 relays flow data in the in-vehicle network 12.

In detail, in the case that an in-vehicle device 111 transmits, for example, data having a large size to another in-vehicle device 111, the in-vehicle device 111 divides the data into a plurality of pieces of data. Flow data is composed of a plurality of IP packets each including a piece of data divided by the in-vehicle device 111. The in-vehicle device 111 transmits the flow data to the other in-vehicle device 111.

In more detail, the flag field in the IP header of an IP packet includes a flag (hereafter also referred to as an intermediate flag) indicating that the IP packet is an intermediate IP packet in the IP packets constituting the flow data.

In the case that the intermediate flag is zero, the IP packet is the IP packet provided last in the flow data (hereafter also referred to as the last IP packet) or an IP packet not including divided pieces of data.

In the case that the intermediate flag is 1, the IP packet is one of the IP packets other than the last IP packet in the flow data, more specifically, for example, the first IP packet (hereafter also referred to as the head IP packet) or the second IP packet.

The flag offset field includes a value indicating the position of the data to be stored in the IP packet. For example, in the head IP packet, the value of the flag offset field is zero.

Hence, in the case that the intermediate flag is 1 and that the value of the flag offset field is zero, the IP packet is the head IP packet. Furthermore, in the case that the intermediate flag is 1 and that the value of the flag offset field is other than zero, the IP packet is the second or subsequent IP packet (hereafter also referred to as an intermediate IP packet) excluding the last IP packet from the flow data. Moreover, in the case that the intermediate flag is zero and that the value of the flag offset field is other than zero, the IP packet is the last IP packet.

Figure 3:
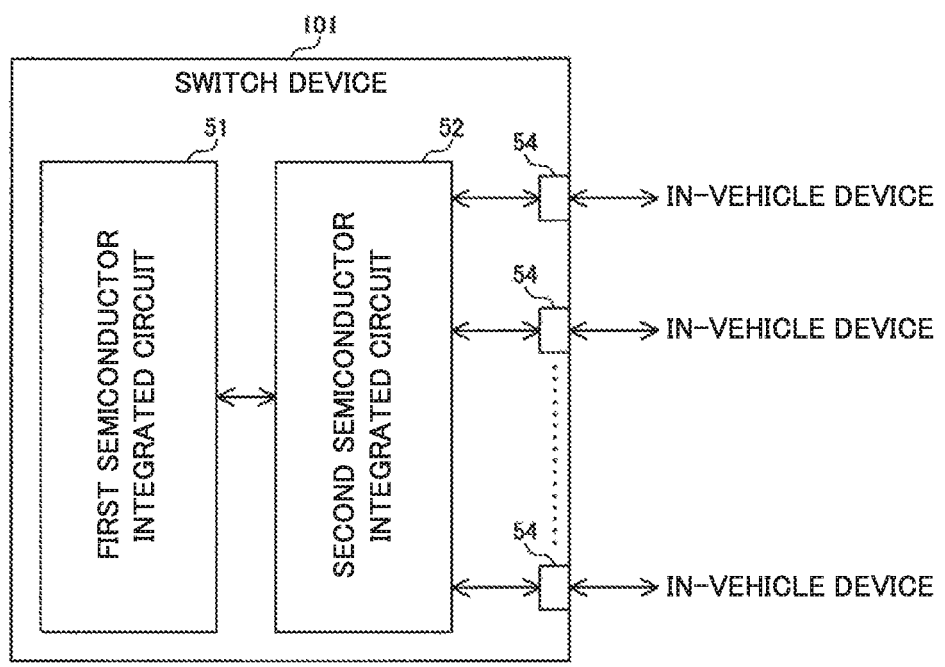
FIG. 3 is a view showing a configuration of a switch device in the in-vehicle communication system according to the first embodiment of the present disclosure.

FIG. 3 is a view showing a configuration of the switch device in the in-vehicle communication system according to the first embodiment of the present disclosure.

Referring to FIG. 3, the switch device 101 is equipped with a first semiconductor integrated circuit 51, a second semiconductor integrated circuit 52 and a plurality of communication ports 54.

The communication ports 54 in the switch device 101 are, for example, terminals to which Ethernet cables can be connected. The communication ports 54 may be the terminals of the integrated circuits.

Each of the plurality of communication ports 54 is connected to one of the plurality of in-vehicle devices 111, for example, via an Ethernet cable.

Figure 4:
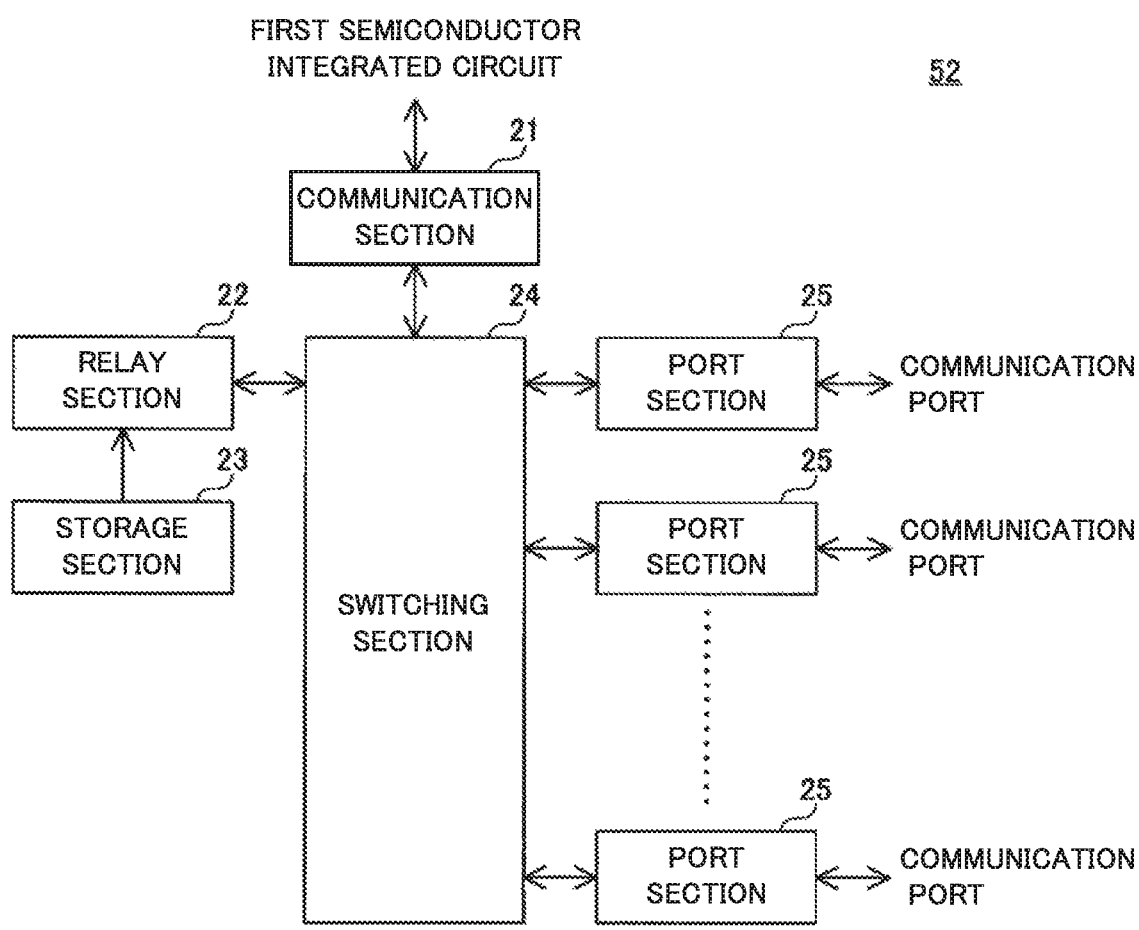
FIG. 4 is a view showing a configuration of a second semiconductor integrated circuit in the switch device according to the first embodiment of the present disclosure.

FIG. 4 is a view showing a configuration of the second semiconductor integrated circuit in the switch device according to the first embodiment of the present disclosure.

Referring to FIG. 4, the second semiconductor integrated circuit 52 includes a communication section 21, a relay section 22, a storage section 23, a switching section 24 and a plurality of port sections 25.

Figure 5:
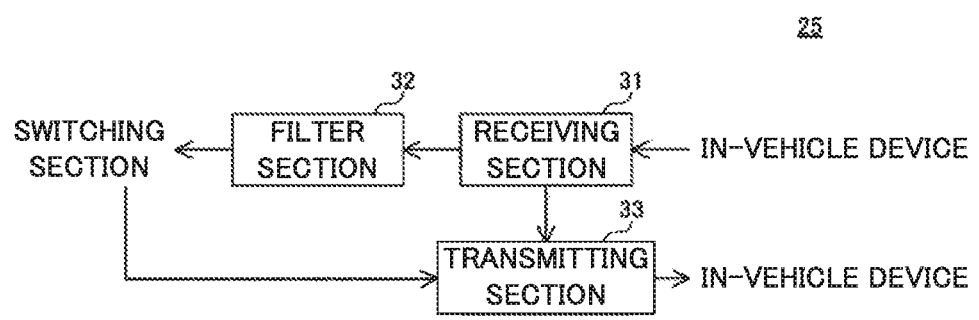
FIG. 5 is a view showing a configuration of the port sections in the second semiconductor integrated circuit according to the first embodiment of the present disclosure.

FIG. 5 is a view showing a configuration of the port section in the second semiconductor integrated circuit according to the first embodiment of the present disclosure.

Referring to FIG. 5, the port section 25 includes a receiving section 31, a filter section 32 and a transmitting section 33.

Figure 6:
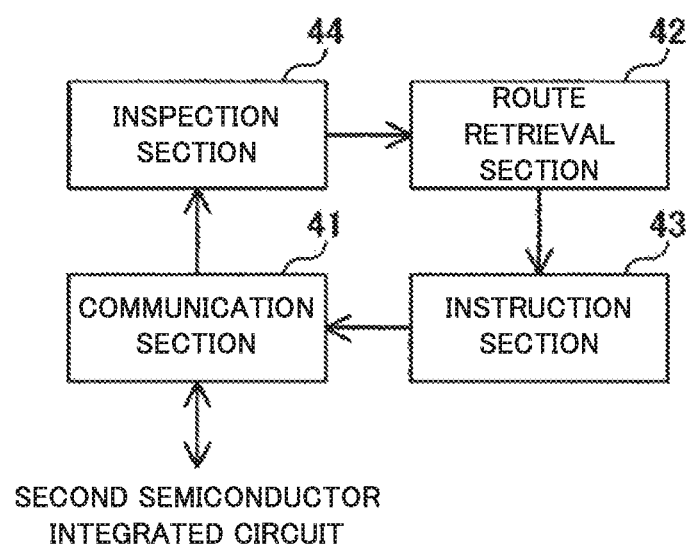
FIG. 6 is a view showing a configuration of the first semiconductor integrated circuit in the switch device according to the first embodiment of the present disclosure.

FIG. 6 is a view showing a configuration of the first semiconductor integrated circuit in the switch device according to the first embodiment of the present disclosure.

Referring to FIG. 6, the first semiconductor integrated circuit 51 includes a communication section 41, a route retrieval section 42, an instruction section 43 and an inspection section 44.

Referring to FIGS. 4 and 5, the second semiconductor integrated circuit 52 is, for example, an L2 switch, and receives Ethernet frames from the outside and transmits Ethernet frames to the outside.

In more detail, the port sections 25 in the second semiconductor integrated circuit 52 are provided so as to correspond to the communication ports 54.

Upon receiving an Ethernet frame from the switching section 24, the transmitting section 33 in the port sections 25 transmits the received Ethernet frame to the destination in-vehicle device 111 via the corresponding communication port 54.

The receiving section 31, for example, has a buffer, and in the case that the receiving section 31 receives an Ethernet frame from an in-vehicle device 111 via the corresponding communication port 54, the receiving section 31 stores the received Ethernet frame in the buffer and outputs the stored Ethernet frame to the filter section 32.

Furthermore, in the case that, for example, the transmission speed of received data is larger than a predetermined limit value, the receiving section 31 transmits a request for lowering the transmission speed is transmitted to the connection destination in-vehicle device 111 via the transmitting section 33, whereby the transmission speed of the received data is limited.

Upon receiving the Ethernet frame from the receiving section 31, the filter section 32 determines whether the received Ethernet frame is output to the switching section 24 or discarded on the basis of predetermined conditions.

In more detail, the filter section 32 determines whether the Ethernet frame is output to the switching section 24 or discarded, for example, according to ACL (Access Control List) having been set by the user.

FIG. 7 is a view showing an example of an ARL table that is used in the switching section according to the first embodiment of the present disclosure.

Referring to FIG. 7, ARL (Address Resolution Logic) table tab 1 indicates the correspondence relationship between a transmission destination MAC address and an output destination. In the case that a VLAN (Virtual Local Area Network) is set in the in-vehicle network 12, the ARL table may indicate the correspondence relationship among a transmission destination MAC address, the ID of the VLAN and an output destination.

The output destination is, for example, a logic port number. This logic port number indicates, for example, either one of the physical number of the communication port 54, the first semiconductor integrated circuit 51 and the relay section 22.

More specifically, logic port numbers 0 to 6 indicate that the output destinations are the communication ports 54. Logic port number 7 indicates that the output destination is the relay section 22. Logic port number 8 indicates that the output destination is the first semiconductor integrated circuit 51. "MAC-DA8" is, for example, the MAC address (hereafter also referred to as the switch address) of the switch device 101.

Although the logic port number corresponding to "MAC-DA8" is 8 in FIG. 7, the number may be rewritten to 7 in some cases. The rewriting of the logic port number will be described later.

The switching section 24 switches, for example, whether Ethernet frames received by the switch device 101 incorporating the switching section 24 are output to the inspection section 44 (see FIG. 6) or to the relay section 22. Furthermore, the switching section 24, for example, outputs the first Ethernet frame to the inspection section 44, and in the case that the first Ethernet frame has passed inspection processing, the switching section 24 outputs the second and subsequent frames to the relay section 22.

(Processing of Ethernet Frames Capable of being Relayed at the L2 Level)

The switching section 24, for example, holds the ARL table Tab 1, and in the case that the switching section 24 receives an Ethernet frame from the port section 25, the switching section 24 confirms the transmission destination MAC address included in the MAC header in the received Ethernet frame.

The switching section 24 refers to the ARL table Tab 1 and acquires the output destination corresponding to the confirmed transmission destination MAC address from the ARL table Tab 1.

More specifically, for an Ethernet frame capable of being relayed at the L2 level, the switching section 24 acquires one of the logic port numbers 0 to 6 from the ARL table Tab 1 as the output destination.

And then, after rewriting the transmission destination MAC address included in the MAC header in the Ethernet frame to the switch address, the switching section 24 outputs the Ethernet frame to the port section 25 corresponding to the acquired logic port number.

(Processing of the First Ethernet Frame)

For example, in the case that the switching section 24 has received an Ethernet frame from the port section 25 and that the transmission destination MAC address included in the MAC header in the received Ethernet frame is the switch address, i.e., "MAC-DA8", the switching section 24 recognizes that the Ethernet frame is an Ethernet frame required to be subjected to relay processing at the L3 level.

After that, the switching section 24 confirms the value of the intermediate flag and the value of the flag offset in the IP packet included in the Ethernet frame.

The switching section 24 determines whether the Ethernet frame includes the head IP packet on the basis of the respective confirmed values.

Upon determining that the Ethernet frame includes the head IP packet, the switching section 24 recognizes that the Ethernet frame is the first Ethernet frame.

And then, in the case that the output destination corresponding to "MAC-DA8" in the ARL table Tab 1 is 7, the switching section 24 rewrites 7 to 8.

The switching section 24 acquires the logic port number 8 as the output destination from the ARL table Tab 1 and outputs the Ethernet frame to the communication section 21 corresponding to the acquired logic port number.

The communication section 21 can transmit and receive data to and from the first semiconductor integrated circuit 51. In more detail, upon receiving an Ethernet frame from the switching section 24, the communication section 21 transmits the received Ethernet frame to the first semiconductor integrated circuit 51.

Referring again to FIG. 6, the communication section 41 in the first semiconductor integrated circuit 51 can transmit and receive data to and from the second semiconductor integrated circuit 52. In more detail, upon receiving an Ethernet frame from the second semiconductor integrated circuit 52, the communication section 41 outputs the received Ethernet frame to the inspection section 44.

The inspection section 44, for example, performs inspection processing for Ethernet frames received by the switch device 101 incorporating the inspection section 44. Furthermore, for example, in the case that the first Ethernet frame constituting the flow data has passed the inspection processing, the inspection section 44 does not perform inspection processing for the second and subsequent Ethernet frames.

In more detail, the inspection section 44 functions as a fire wall, and in the case that the inspection section 44 has received an Ethernet frame from the communication section 41, the inspection section 44 perform inspection processing for the IP packet included in the received Ethernet frame.

More specifically, the inspection section 44 performs SPI (Stateful Packet Inspection) for the IP packet, and in the case that the inspection section 44 has found an abnormality, the inspection section 44 discards the Ethernet frame including the IP packet.

On the other hand, in the case that the inspection section 44 finds no abnormality, the inspection section 44 outputs the Ethernet frame including the IP packet to the route retrieval section 42.

The route retrieval section 42, for example, retrieves the transmission route of the IP packet and reduces the TTL (Time To Live) value stored in the header of the IP packet by one.

In more detail, the route retrieval section 42, for example, holds a routing table indicating the correspondence relationship between a destination network and a transmission interface. Furthermore, the route retrieval section 42, for example, holds an ARP (Address Resolution Protocol) table indicating the correspondence relationship between an IP address and an MAC address for each transmission interface.

Upon receiving an Ethernet frame from the inspection section 44, the route retrieval section 42 acquires the transmission destination IP address from the IP packet included in the received Ethernet frame and performs a sub net mask calculation for the acquired transmission destination IP address, thereby specifying a destination network.

The route retrieval section 42 refers to the routing table and specifies the transmission interface corresponding to the specified destination network.

And then, the route retrieval section 42 refers to the ARP table corresponding to the specified transmission interface and acquires the MAC address (hereafter also referred to as the retrieval address) corresponding to the transmission destination IP address from the ARP table.

The route retrieval section 42 rewrites the transmission destination MAC address and the transmission source MAC address of the Ethernet frame to the retrieval address and the switch address, respectively, and outputs the Ethernet frame to the instruction section 43.

The instruction section 43 creates instruction information for switching the output destination of the Ethernet frame required to be subjected to the relay processing at the L3 level from the first semiconductor integrated circuit 51 incorporating the instruction section 43 to the relay section in the switching section 24 and then transmits the created instruction information to the second semiconductor integrated circuit 52 via the communication section 41.

In more detail, upon receiving the Ethernet frame from the route retrieval section 42, the instruction section 43 creates instruction information including an instruction for rewriting the output destination corresponding to "MAC-DA8" in the ARL table tab 1 from 8 to 7.

The instruction section 43 attaches the created instruction information to the Ethernet frame and transmits the Ethernet frame to the second semiconductor integrated circuit 52 via the communication section 41.

Referring again to FIG. 4, upon receiving the Ethernet frame to which the instruction information is attached from the first semiconductor integrated circuit 51 via the communication section 21, the switching section 24 in the second semiconductor integrated circuit 52 confirms the transmission destination MAC address included in the MAC header in the received Ethernet frame.

The switching section 24 refers to the ARL table Tab 1 and acquires the output destination corresponding to the confirmed transmission destination MAC address, i.e., the retrieval address, from the ARL table Tab 1.

In this case, the switching section 24 acquires one of the logic port numbers 0 to 6 from the ARL table Tab 1 as the output destination and outputs the Ethernet frame to the port section 25 corresponding to the acquired logic port number.

Furthermore, the switching section 24 rewrites the output destination corresponding to "MAC-DA8" in the ARL table Tab 1 from 8 to 7 according to the instruction information received from the first semiconductor integrated circuit 51.

(Processing of the Second and Subsequent Ethernet Frames)

For example, in the case that the switching section 24 has received an Ethernet frame from the port section 25 and recognizes that the received Ethernet frame is an Ethernet frame required to be subjected to the relay processing at the L3 level, the switching section 24 confirms the value of the intermediate flag and the value of the flag offset in the IP packet included in the Ethernet frame.

Upon determining that the Ethernet frame includes an intermediate IP packet or the last IP packet on the basis of the respective confirmed values, the switching section 24 acquires the logic port number 7 from the ARL table Tab 1 as the output destination and outputs the Ethernet frame to the relay section 22 corresponding to the acquired logic port number.

FIG. 8 is a view showing an example of a conversion table stored in the storage section in the switch device according to the first embodiment of the present disclosure.

Referring to FIG. 8, the storage section 23 stores correspondence information indicating the correspondence relationship among a transmission destination IP address, a transmission source IP address, a communication protocol, a transmission destination port information, a transmission source port information, a transmission destination MAC address and a transmission source MAC address. Furthermore, the storage section 23, for example, fixedly stores the correspondence information.

More specifically, the storage section 23 stores a conversion table Tab 2 serving as an example of the correspondence information. A transmission destination port number and a transmission source port number are examples of the transmission destination port information and the transmission source port information, respectively.

For example, since the connection topology and IP addresses in the in-vehicle network 12 are fixedly operated, all the combinations of L3 relays can be determined preliminarily. The conversion table Tab 2, for example, includes all the combinations of the transmission destination IP address, the transmission source IP address, the communication protocol, the transmission destination port number and the transmission source port number capable of being subjected to L3 relay processing in the in-vehicle network 12.

Referring again to FIG. 4, the relay section 22 acquires the transmission destination MAC address from the correspondence information on the basis of the transmission destination IP address, the transmission source IP address, the communication protocol, the transmission destination port information and the transmission source port information included in an Ethernet frame that is received by the switch device 101 incorporating the relay section 22 and constitutes the flow data.

And then, the relay section 22 performs transmission processing to transmit the Ethernet frame including the acquired transmission destination MAC address. In detail, the relay section 22, for example, performs transmission processing for the second or subsequent Ethernet frame.

In more detail, upon receiving the second or subsequent Ethernet frame from the switching section 24, the relay section 22 confirms the contents of the IP packet included in the received Ethernet frame. More specifically, the relay section 22 confirms the transmission destination IP address, the transmission source IP address, the communication protocol, the transmission destination port number and the transmission source port number.

After that, the relay section 22 refers to the conversion table Tab 2 and acquires the transmission destination MAC address and the transmission source MAC address corresponding to the confirmed transmission destination IP address, transmission source IP address, communication protocol, transmission destination port number and transmission source port number from the conversion table Tab 2.

The transmission destination MAC address and the transmission source MAC address are herein the retrieval address and the switch address, respectively.

The relay section 22 rewrites the transmission destination MAC address and the transmission source MAC address of the Ethernet frame to the acquired retrieval address and switch address, respectively, and outputs the Ethernet frame to the switching section 24.

Upon receiving the Ethernet frame from the relay section 22, the switching section 24 confirms the transmission destination MAC address included in the MAC header in the received Ethernet frame.

The switching section 24 refers to the ARL table Tab 1 and acquires the output destination corresponding to the confirmed transmission destination MAC address, that is, the retrieval address, from the ARL table Tab 1.

In this case, the switching section 24 acquires the same logic port number as the output destination from the ARL table Tab 1 as in the case of the above-mentioned first Ethernet frame and transmits the Ethernet frame to the destination in-vehicle device 111 via the port section 25 corresponding to the acquired logic port number.

Modification Example of the Switch Device 101

FIG. 9 is a view showing an example of a conversion table stored in the storage section in a modification example of the switch device according to the first embodiment of the present disclosure.

Referring to FIG. 9, the storage section 23 stores correspondence information indicating the correspondence relationship among a transmission destination MAC address, a transmission source MAC address and a value uniquely determining a transmission destination IP address, a transmission source IP address, a communication protocol, transmission destination port information and transmission source port information. Furthermore, the storage section 23, for example, fixedly stores the correspondence information.

More specifically, the storage section 23 stores a conversion table Tab 3 serving as an example of the correspondence information. A hash value is an example of a value uniquely determining the transmission destination IP address, the transmission source IP address, the communication protocol, the transmission destination port information and the transmission source port information.

In more detail, the hash value is a value generated using a predetermined calculation procedure P1 by using the transmission destination IP address, the transmission source IP address, the communication protocol, the transmission destination port number and the transmission source port number as retrieval keys.

The conversion table Tab 3, for example, includes the hash values for all the combinations of the transmission destination IP address, the transmission source IP address, the communication protocol, the transmission destination port number and the transmission source port number capable of being subjected to L3 relay processing in the in-vehicle network 12.

Furthermore, the hash values in the conversion table Tab 3 have been preliminarily checked so as not to overlap. For example, in the case that overlapping hash values are present, new hash values are generated using other calculation procedures so that the hash values in the conversion table Tab 3 do not overlap.

Referring again to FIG. 4, the relay section 22 acquires, from the correspondence information, the transmission destination MAC address corresponding to a value, which is included in an Ethernet frame that is received by the switch device 101 incorporating the relay section 22 and constitutes the flow data and which uniquely determines the transmission destination IP address, the transmission source IP address, the communication protocol, the transmission destination port information and the transmission source port information of the Ethernet frame.

And then, the relay section 22 performs transmission processing to transmit the Ethernet frame including the acquired transmission destination MAC address. In detail, the relay section 22, for example, performs transmission processing for at least the second or subsequent Ethernet frame.

(Processing of the Second and Subsequent Ethernet Frames)

In more detail, upon receiving the second or subsequent Ethernet frame from the switching section 24, the relay section 22 acquires the transmission destination IP address, the transmission source IP address, the communication protocol, the transmission destination port number and the transmission source port number from the received Ethernet frame.

The relay section 22 generates a hash value using the calculation procedure P1 by using the acquired transmission destination IP address, the transmission source IP address, communication protocol, transmission destination port number and transmission source port number as retrieval keys.

And then, the relay section 22 refers to the conversion table Tab 3 and acquires the transmission destination MAC address and the transmission source MAC address corresponding to the generated hash value from the conversion table Tab 3.

The transmission destination MAC address and the transmission source MAC address are herein the retrieval address and the switch address, respectively.

The relay section 22 rewrites the transmission destination MAC address and the transmission source MAC address of the Ethernet frame to the acquired retrieval address and switch address, respectively, and outputs the Ethernet frame to the switching section 24.

Flow of Operation

Each device in the in-vehicle communication system 301 is equipped with a computer, and an arithmetic processing section, such as a CPU, in the computer reads programs including part or all of the respective steps of the sequence diagrams or flow charts described below from a memory (not shown), and then executes the programs. The programs of the plurality of devices can be installed from the outside. The programs of the plurality of devices are each distributed in a state of being stored in a recording medium.

Figure 10:
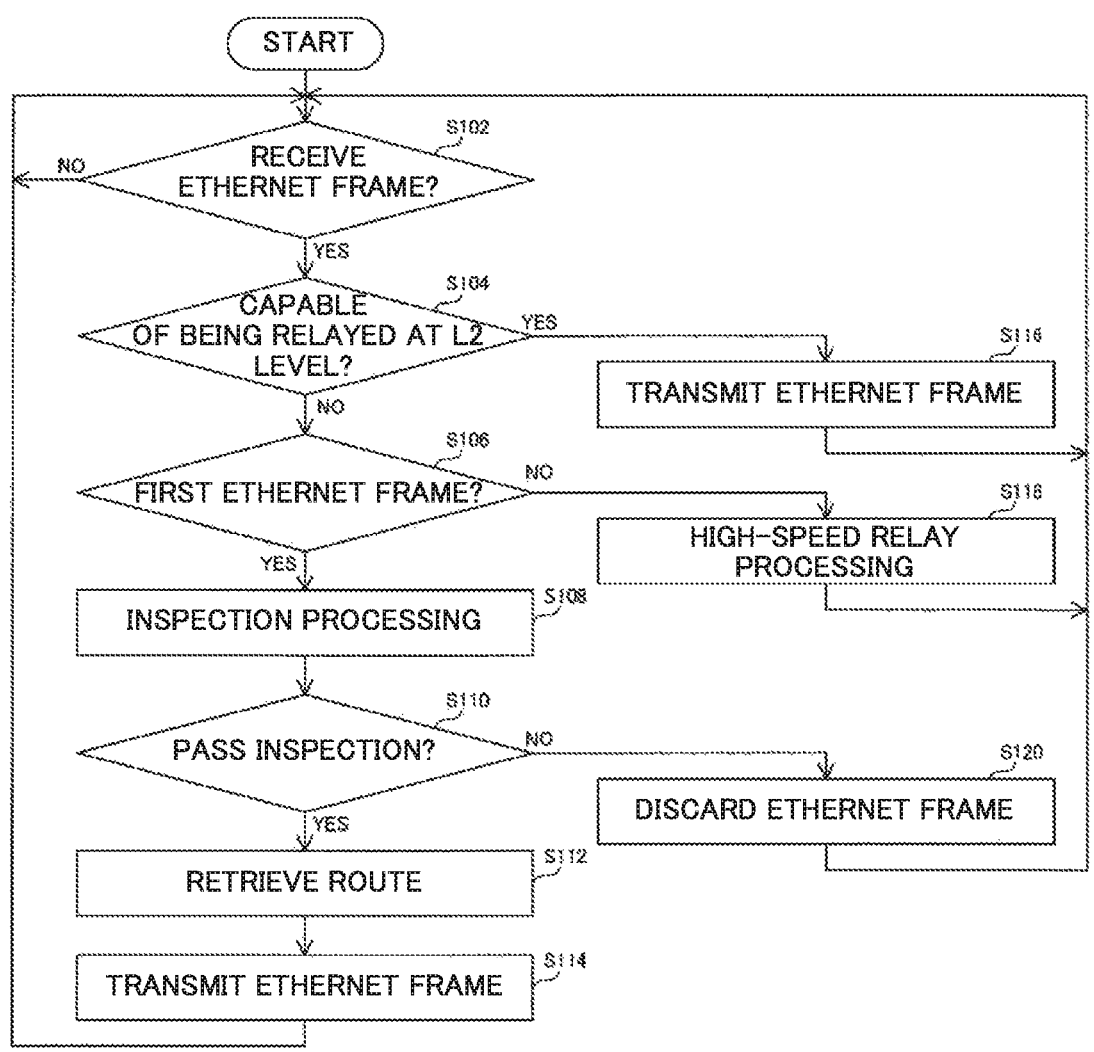
FIG. 10 is a flow chart determining an operation procedure at the time when the switch device in the in-vehicle communication system according to the first embodiment of the present disclosure performs the relay processing of an Ethernet frame.

FIG. 10 is a flow chart determining an operation procedure at the time when the switch device in the in-vehicle communication system according to the first embodiment of the present disclosure performs the relay processing of an Ethernet frame.

Referring to FIG. 10, first, the switch device 101 stands by until the switch device 10 receives an Ethernet frame from an in-vehicle device 111 (NO at step S102).

And then, when the switch device 101 receives an Ethernet frame from an in-vehicle device 111 (YES at step S102), and in the case that the received Ethernet frame can be relayed at the L2 level (YES at step S104), the following processing is performed.

In other words, the switch device 101 rewrites the transmission source MAC address of the Ethernet frame to the switch address and transmits the Ethernet frame to the destination in-vehicle device 111 (at step S116).

On the other hand, in the case that the received Ethernet frame is an Ethernet frame required to be subjected to the relay processing at the L3 level (NO at step S104), the switch device 101 determines whether the Ethernet frame is the first Ethernet frame (at step S106).

In the case that the switch device 101 determines that the Ethernet frame is the second or subsequent Ethernet frame (NO at step S106), the switch device 101 performs high-speed relay processing described later (at step S118).

On the other hand, in the case that the switch device 101 determines that the Ethernet frame is the first Ethernet frame (YES at step S106), the switch device 101 performs inspection processing for the Ethernet frame (at step S108).

Next, in the case that the Ethernet frame has not passed the inspection processing (NO at step S110), the switch device 101 discards the Ethernet frame (at step S120).

On the other hand, in the case that the Ethernet frame has passed the inspection processing (YES at step S110), the switch device 101 retrieves the route of the IP packet included in the Ethernet frame and reduces the TTL value stored in the header of the IP packet by one (at step S112).

Next, the switch device 101 rewrites the transmission destination MAC address and the transmission source MAC address of the Ethernet frame to the retrieval address and the switch address based on the result of the retrieval, respectively, and then transmits the Ethernet frame to the destination in-vehicle device 111 (at step S114).

Next, the switch device 101 transmits the Ethernet frame to the destination in-vehicle device 111 (at step S114 or S116) or performs the high-speed relay processing (at step S118) or discards the Ethernet frame (at step S120), and then the switch device 101 stands by until the switch device 101 receives a new Ethernet frame from the in-vehicle device 111 (NO at step S102).

Figure 11:
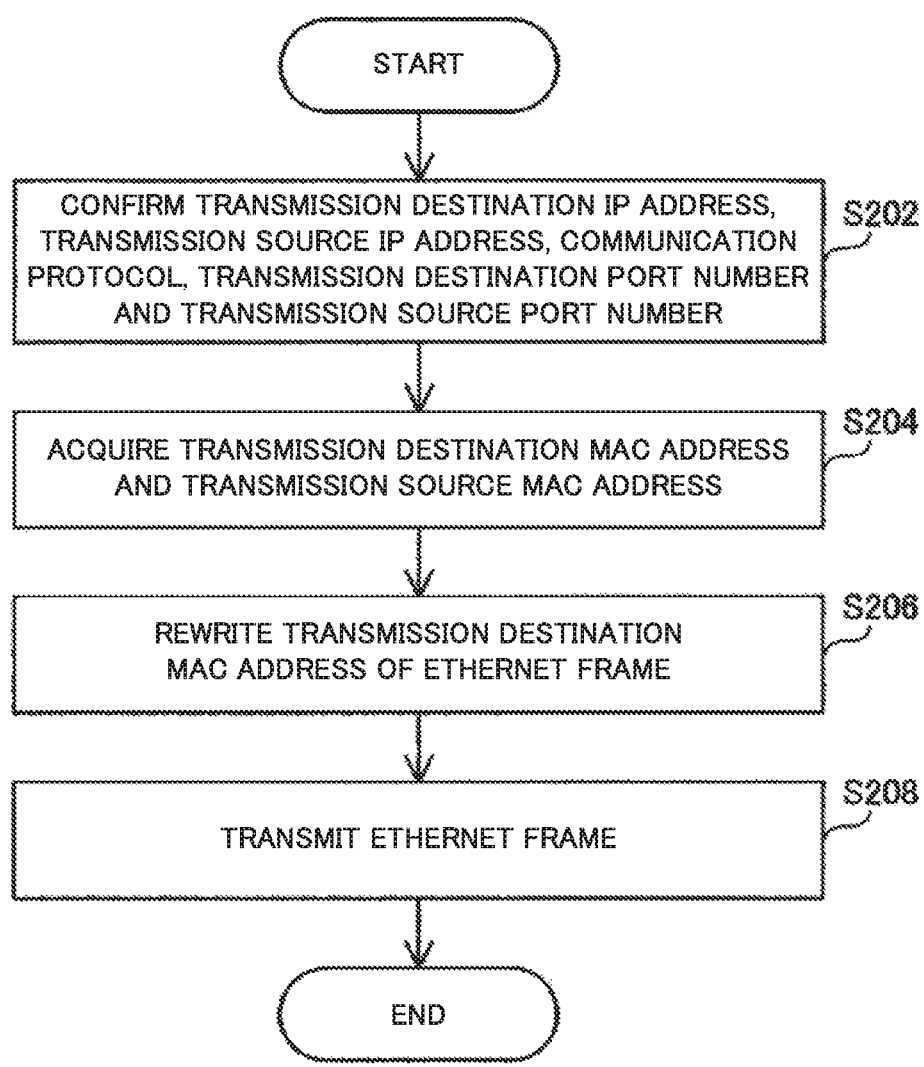
FIG. 11 is a flow chart determining an operation procedure at the time when the switch device in the in-vehicle communication system according to the first embodiment of the present disclosure performs high-speed relay processing.

FIG. 11 is a flow chart determining an operation procedure at the time when the switch device in the in-vehicle communication system according to the first embodiment of the present disclosure performs the high-speed relay processing. FIG. 11 shows the details of the operation at step S118 in FIG. 10.

Referring to FIG. 11, first, the switch device 101 confirms the transmission destination IP address, the transmission source IP address, the communication protocol, the transmission destination port number and the transmission source port number included in the second or subsequent Ethernet frame (at step S202).

Next, the switch device 101 refers to the conversion table Tab 2 and acquires the transmission destination MAC address and the transmission source MAC address corresponding to the confirmed transmission destination IP address, transmission source IP address, communication protocol, transmission destination port number and transmission source port number from the conversion table Tab 2 (at step S204).

More specifically, the switch device 101, for example, acquires the retrieval address and the switch address as the transmission destination MAC address and the transmission source MAC address, respectively.

Next, the switch device 101 rewrites the transmission destination MAC address and the transmission source MAC address of the Ethernet frame to the acquired retrieval address and switch address, respectively (at step S206).

Next, the switch device 101 transmits the Ethernet frame, the transmission destination MAC address and the transmission source MAC address of which have been rewritten, to the destination in-vehicle device 111 (at step S208).

The switch device 101 is not limited to have a configuration in which the high-speed relay processing is performed using the conversion table Tab 2, but may have a configuration in which the high-speed relay processing is performed using the conversion table Tab 3.

Figure 12:
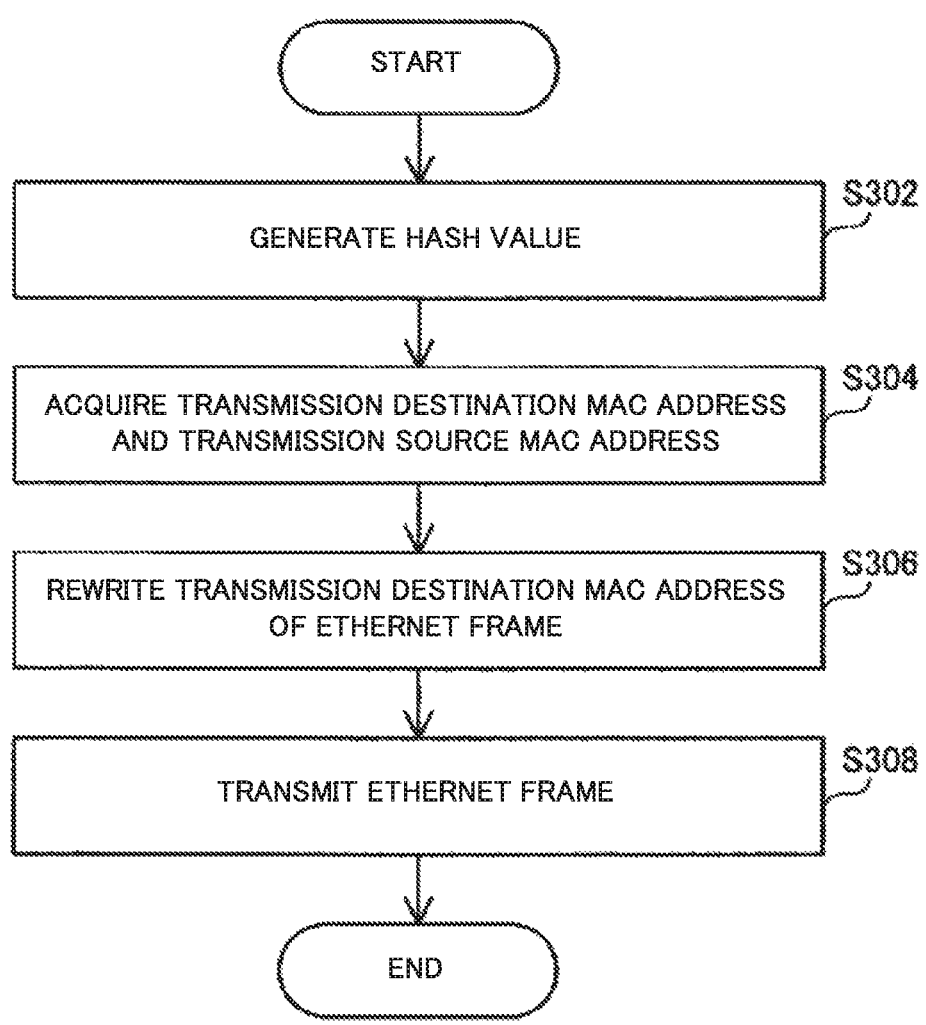
FIG. 12 is a flow chart determining an operation procedure at the time when the switch device in the in-vehicle communication system according to the first embodiment of the present disclosure performs the high-speed relay processing.

FIG. 12 is a flow chart determining an operation procedure at the time when the switch device in the in-vehicle communication system according to the first embodiment of the present disclosure performs the high-speed relay processing. FIG. 12 shows the details of the operation at step S118 in FIG. 10.

Referring to FIG. 12, first, the switch device 101 generates a hash value (at step S302) using the predetermined calculation procedure P1 by using the transmission destination IP address, the transmission source IP address, the communication protocol, the transmission destination port number and the transmission source port number included in the second or subsequent Ethernet frame as retrieval keys.

Next, the switch device 101 refers to the conversion table Tab 3 and acquires the transmission destination MAC address and the transmission source MAC address corresponding to the generated hash value from the conversion table Tab 3 (at step S304).

More specifically, the switch device 101, for example, acquires the retrieval address and the switch address as the transmission destination MAC address and the transmission source MAC address, respectively.

Next, the switch device 101 rewrites the transmission destination MAC address and the transmission source MAC address of the Ethernet frame to the acquired retrieval address and switch address, respectively (at step S306).

Next, the switch device 101 transmits the Ethernet frame, the transmission destination MAC address and the transmission source MAC address of which have been rewritten, to the destination in-vehicle device 111 (at step S308).

Comparison Example

Figure 13:
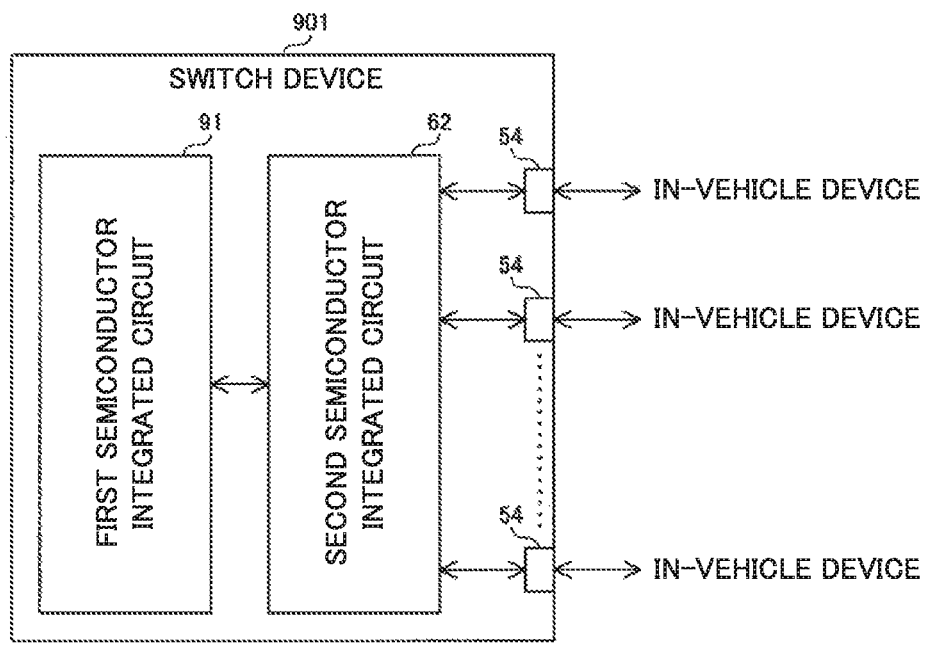
FIG. 13 is a view showing a configuration of a comparison example of the switch device in the in-vehicle communication system according to the first embodiment of the present disclosure.

FIG. 13 is a view showing a configuration of a comparison example of the switch device in the in-vehicle communication system according to the first embodiment of the present disclosure.

Referring to FIG. 13, a switch device 901 serving as the comparison example is equipped with a first semiconductor integrated circuit 91, a second semiconductor integrated circuit 62 and the plurality of communication ports 54.

The operations of the communication ports 54 in the switch device 901 are similar to those of the communication ports 54 in the switch device 101 shown in FIG. 3.

Figure 14:
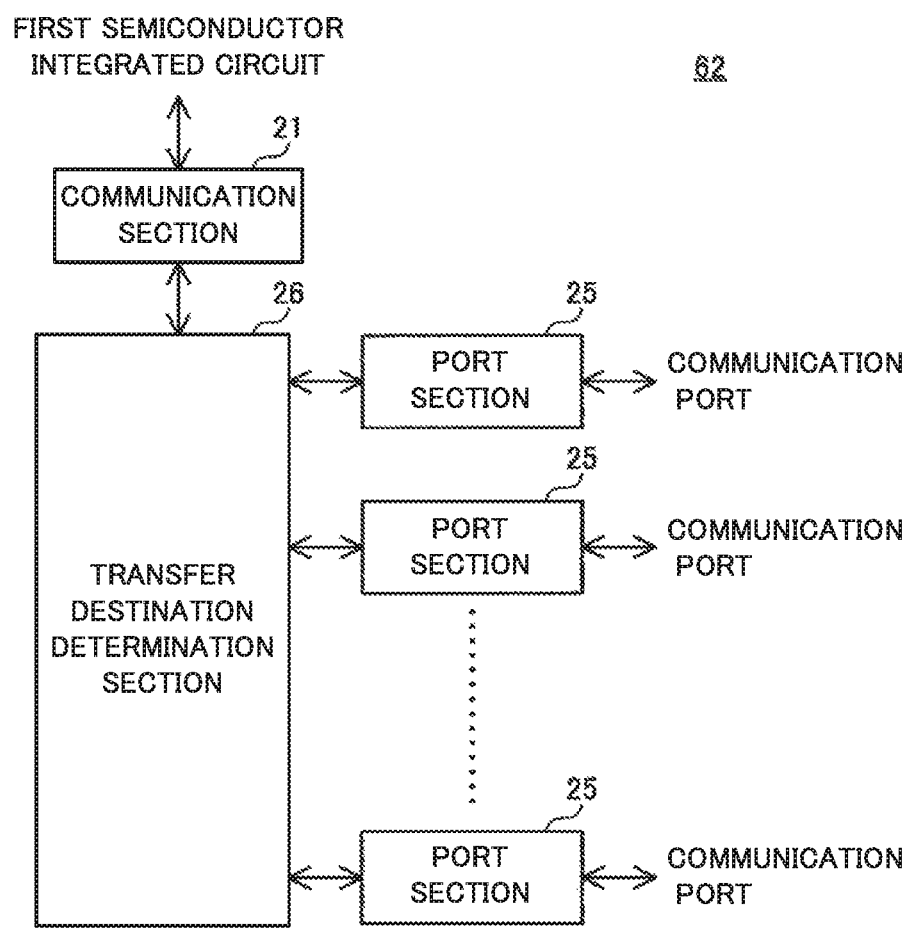
FIG. 14 is a view showing a configuration of the second semiconductor integrated circuit in the comparison example of the switch device according to the first embodiment of the present disclosure.

FIG. 14 is a view showing a configuration of the second semiconductor integrated circuit in the comparison example of the switch device according to the first embodiment of the present disclosure.

Referring to FIG. 14, the second semiconductor integrated circuit 62 includes the communication section 21, the plurality of port sections 25 and a transfer destination determination section 26.

The operations of the communication section 21 and the port sections 25 in the second semiconductor integrated circuit 62 are similar to those of the communication section 21 and the port sections 25 in the second semiconductor integrated circuit 52 shown in FIG. 4, respectively.

Referring to FIG. 14, the second semiconductor integrated circuit 62 is, for example, an L2 switch, and receives Ethernet frames from the outside and transmits Ethernet frames to the outside.

In more detail, the transfer destination determination section 26 in the second semiconductor integrated circuit 62 holds the ARL table Tab 1 (see FIG. 7).

The output destination is herein, for example, either one of the physical number of the communication port 54 and the first semiconductor integrated circuit 91.

More specifically, the logic port numbers 0 to 6 indicate that the output destinations are the communication ports 54. Logic port number 8 indicates that the output destination is the first semiconductor integrated circuit 91.

"MAC-DA8" is, for example, the MAC address of the switch device 901, that is, the switch address. In this example, the logic port number corresponding to "MAC-DA8" is fixed to, for example, 8.

(Processing of Ethernet Frames Capable of being Relayed at the L2 Level)

For example, upon receiving an Ethernet frame from the port section 25, the transfer destination determination section 26 confirms the transmission destination MAC address included in the MAC header in the received Ethernet frame.

The transfer destination determination section 26 refers to the ARL table Tab 1 and acquires the output destination corresponding to the confirmed transmission destination MAC address from the ARL table Tab 1.

More specifically, for an Ethernet frame capable of being relayed at the L2 level, the transfer destination determination section 26 acquires one of the logic port numbers 0 to 6 from the ARL table Tab 1 as the output destination.

And then, after rewriting the transmission destination MAC address included in the MAC header in the Ethernet frame to the switch address, the transfer destination determination section 26 outputs the Ethernet frame to the port section 25 corresponding to the acquired logic port number.

Moreover, for an Ethernet frame capable of being relayed at the L3 level, the transfer destination determination section 26 acquires the logic port number 8 from the ARL table Tab 1 as the output destination.

After that, the switching section 24 transmits the Ethernet frame to the first semiconductor integrated circuit 91 via the communication section 21.

Figure 15:
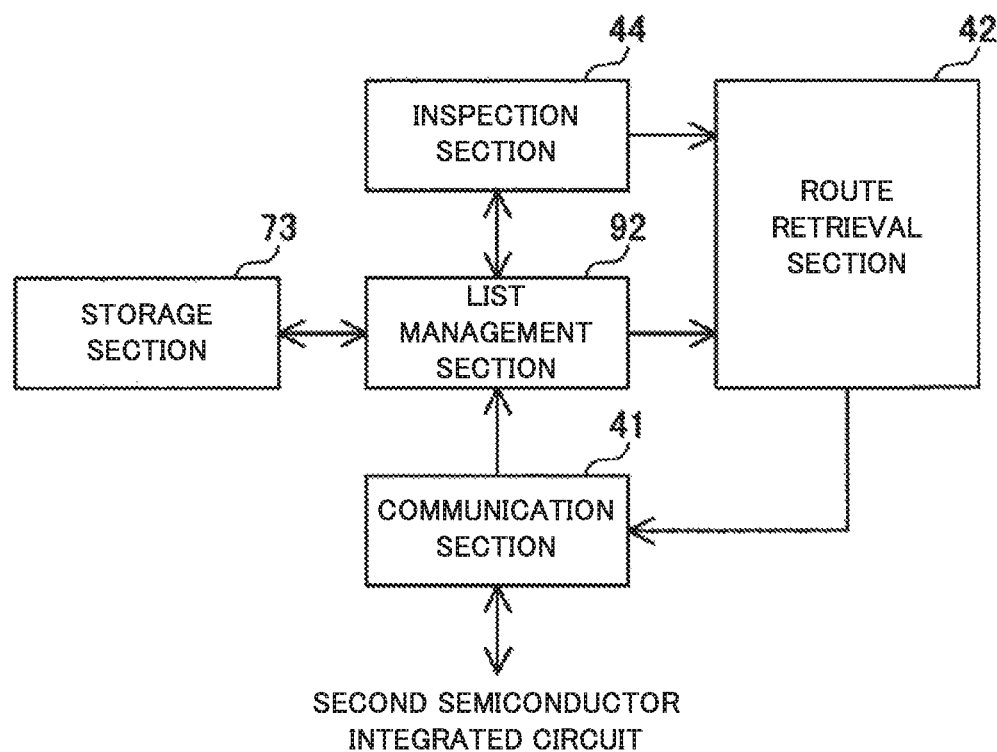
FIG. 15 is a view showing a configuration of the first semiconductor integrated circuit in the comparison example of the switch device according to the first embodiment of the present disclosure.

FIG. 15 is a view showing a configuration of the first semiconductor integrated circuit in the comparison example of the switch device according to the first embodiment of the present disclosure.

Referring to FIG. 15, the first semiconductor integrated circuit 91 includes the communication section 41, the route retrieval section 42, the inspection section 44, a storage section 73 and a list management section 92.

The operations of the communication section 41, the route retrieval section 42 and the inspection section 44 in the first semiconductor integrated circuit 91 are similar to those of the communication section 41, the route retrieval section 42 and the inspection section 44 in the first semiconductor integrated circuit 51 shown in FIG. 6.

FIG. 16 is a view showing an example of a flow list stored in the storage section in the comparison example of the switch device according to the first embodiment of the present disclosure.

Referring to FIG. 16, the storage section 73 in the first semiconductor integrated circuit 91, for example, stores a flow list Lst 1 indicating the correspondence relationship among a transmission destination IP address, a transmission source IP address, a communication protocol, a transmission destination port number, a transmission source port number and a time stamp.

Unlike, for example, the conversion table Tab 2 shown in FIG. 8, the flow list Lst 1 does not always include all the combinations of the transmission destination IP address, the transmission source IP address, the communication protocol, the transmission destination port number and the transmission source port number capable of being subjected to L3 relay processing in the in-vehicle network 12. The contents of the flow list Lst 1 are dynamically changed, for example, by the list management section 92.

(Processing of the First Ethernet Frame)

Referring again to FIG. 15, upon receiving the first Ethernet frame required to be subjected to the relay processing at the L3 level from the second semiconductor integrated circuit 62 via the communication section 41, the list management section 92 confirms the contents of the IP packet included in the received Ethernet frame. More specifically, the list management section 92 confirms the transmission destination IP address, the transmission source IP address, the communication protocol, the transmission destination port number and the transmission source port number.

And then, the list management section 92 refers to the flow list Lst 1 and confirms whether the confirmed transmission destination IP address, transmission source IP address, communication protocol, transmission destination port number and transmission source port number are registered in the low list Lst 1.

Upon confirming that they are not registered, the list management section 92 determines that the Ethernet frame received from the second semiconductor integrated circuit 62 is the first Ethernet frame and outputs the Ethernet frame to the inspection section 44.

Upon receiving the Ethernet frame from the switching section 74, the inspection section 44 performs inspection processing for the IP packet included in the received Ethernet frame, and in the case that the inspection section 44 has found an abnormality, the inspection section 44 discards the Ethernet frame including the IP packet.

On the other hand, in the case that the inspection section 44 finds no abnormality, the inspection section 44 outputs the Ethernet frame including the IP packet to the route retrieval section 42.

The list management section 92 manages the flow list Lst 1 stored in the storage section 73. More specifically, after outputting the Ethernet frame to the inspection section 44, the list management section 92 monitors the inspection processing for the Ethernet frame in the inspection section 44.

In the case that the inspection section 44 finds no abnormality in the Ethernet frame, the list management section 92 registers the transmission destination IP address, the transmission source IP address, the communication protocol, the transmission destination port number and the transmission source port number included in the Ethernet frame and also registers the time stamp indicating the current time (hereafter these are also referred to as flow information) in the flow list Lst 1.

On the other hand, in the case that the inspection section 44 has found an abnormality in the Ethernet frame, the list management section 92 does not register the flow information about the Ethernet frame in the flow list Lst 1.

Upon receiving the Ethernet frame from the inspection section 44, the route retrieval section 42 reduces the TTL value stored in the header of the IP packet included in the received Ethernet frame by one and performs the following processing.

In other words, on the basis of the routing table and the ARP table, the route retrieval section 42 acquires the MAC address corresponding to the transmission destination IP address, that is, the retrieval address.

And then, the route retrieval section 42 rewrites the transmission destination MAC address and the transmission source MAC address of the Ethernet frame to the retrieval address and the switch address and then transmits the Ethernet frame to the second semiconductor integrated circuit 62 via the communication section 41.

Referring again to FIG. 14, upon receiving an Ethernet frame from the first semiconductor integrated circuit 91 via the communication section 21, the transfer destination determination section 26 in the second semiconductor integrated circuit 62 confirms the transmission destination MAC address included in the MAC header in the received Ethernet frame.

The transfer destination determination section 26 refers to the ARL table Tab 1 and acquires the output destination corresponding to the confirmed transmission destination MAC address, that is, the retrieval address, from the ARL table Tab 1.

In this case, the transfer destination determination section 26 acquires one of the logic port numbers 0 to 6 from the ARL table Tab 1 as the output destination and transmits the Ethernet frame to the destination in-vehicle device 111 via the port section 25 corresponding to the acquired logic port number.

(Processing of the Second and Subsequent Ethernet Frames)

Referring again to FIG. 15, upon receiving the second or subsequent Ethernet frame required to be subjected to the relay processing at the L3 level from the second semiconductor integrated circuit 62 via the communication section 41, the list management section 92 confirms the transmission destination IP address, the transmission source IP address, the communication protocol, the transmission destination port number and the transmission source port number included in the received Ethernet frame.

And then, the list management section 92 refers to the flow list Lst 1 and confirms whether the confirmed transmission destination IP address, transmission source IP address, communication protocol, transmission destination port number and transmission source port number are registered in the low list Lst 1.

Upon confirming that they are registered, the list management section 92 determines that the Ethernet frame received from the second semiconductor integrated circuit 62 is the second or subsequent Ethernet frame and outputs the Ethernet frame to the route retrieval section 42.

Furthermore, for example, in the case that a predetermined time has passed from the time indicated by the time stamp and in the case that the Ethernet frame including the last IP packet in the flow data has been processed, the list management section 92 deletes the corresponding flow information from the flow list Lst 1.

In the switch device according to the first embodiment of the present disclosure, although the correspondence information is configured so as to indicate the correspondence relationship among the transmission destination IP address, the transmission source IP address, the communication protocol, the transmission destination port information, the transmission source port information, the transmission destination MAC address and the transmission source MAC address, the configuration is not limited to this. The correspondence information may be configured so as to indicate the correspondence relationship among the transmission destination IP address, the transmission source IP address, the transmission destination port information, the transmission source port information and the transmission destination MAC address excluding the communication protocol and the transmission source MAC address. For example, in the case that the communication protocol in the in-vehicle network 12 is fixed to either one of TCP and UDP, the object of the present disclosure for efficiently performing the relay processing of IP packets in the in-vehicle network can be achieved by the above-mentioned configuration. Furthermore, the correspondence information may be configured so as to indicate the correspondence relationship among the transmission destination IP address, the transmission source IP address, the communication protocol, the transmission destination port information, the transmission source port information and the transmission destination MAC address excluding the transmission source MAC address.

Moreover, in the switch device according to the first embodiment of the present disclosure, although the relay section 22 is configured so as to acquire the transmission destination MAC address from the correspondence information on the basis of the transmission destination IP address, the transmission source IP address, the communication protocol, the transmission destination port information, the transmission source port information included in the Ethernet frame, the configuration is not limited to this. The relay section 22 may be configured so as to acquire the transmission destination MAC address from the correspondence information on the basis of the transmission destination IP address, the transmission source IP address, the transmission destination port information and the transmission source port information included in the Ethernet frame, excluding the communication protocol.

What's more, in the modification example of the switch device according to the first embodiment of the present disclosure, although the correspondence information is configured so as to indicate the correspondence relationship among the transmission destination MAC address, the transmission source MAC address and a value uniquely determining the transmission destination IP address, the transmission source IP address, the communication protocol, the transmission destination port information and the transmission source port information, the configuration is not limited to this. The correspondence information may be configured so as to indicate the correspondence relationship between the transmission destination MAC address and a value uniquely determining the transmission destination IP address, the transmission source IP address, the transmission destination port information and the transmission source port information excluding the communication protocol. For example, in the case that the communication protocol in the in-vehicle network 12 is fixed to either one of TCP and UDP, the object of the present disclosure for efficiently performing the relay processing of IP packets in the in-vehicle network can be achieved by the above-mentioned configuration. Furthermore, the correspondence information may be configured so as to indicate the correspondence relationship between the transmission destination MAC address and a value uniquely determining the transmission destination IP address, the transmission source IP address, the transmission destination port information and the transmission source port information.

Furthermore, in the switch device according to the first embodiment of the present disclosure, although the storage section 23 is configured so as to be provided inside the second semiconductor integrated circuit, the configuration is not limited to this. The storage section 23 may be configured so as to be provided outside the second semiconductor integrated circuit 52.

Moreover, in the switch device according to the first embodiment of the present disclosure, although the correspondence information is configured so as to be preliminarily stored in the storage section 23, the configuration is not limited to this. For example, the switch device 101 may be configured so as to acquire the correspondence relationship among the transmission destination IP address, the transmission source IP address, the communication protocol, the transmission destination port information, the transmission source port information, the transmission destination MAC address and the transmission source MAC address each time the processing of the flow data is performed and so as to update the correspondence information in the storage section 23 according to the acquired correspondence relationship.

What's more, in the modification example of the switch device according to the first embodiment of the present disclosure, although the correspondence information is configured so as to be preliminarily stored in the storage section 23, the configuration is not limited to this. For example, the modification example of the switch device 101 may be configured so as to acquire the correspondence relationship among the transmission destination MAC address, the transmission source MAC address and a value uniquely determining the transmission destination IP address, the transmission source IP address, the communication protocol, the transmission destination port information and the transmission source port information each time the processing of the flow data is performed and so as to update the correspondence information in the storage section 23 according to the acquired correspondence relationship.

More and more, although the switch device according to the first embodiment of the present disclosure is configured so as to equipped with the inspection section 44, the configuration is not limited to this. The switch device 101 may be configured so as not to be equipped with the switching section 24 and the inspection section 44, for example, in the case that security is ensured in communication and that it is not necessary to inspect data included in Ethernet frames. In this case, the switch device 101, for example, outputs all the Ethernet frames required to be subjected to the relay processing at the L3 level to the relay section 22.

Still further, in the switch device according to the first embodiment of the present disclosure, although the relay section 22 is configured so as to perform transmission processing for the second and subsequent Ethernet frames, the configuration is not limited to this. The relay section 22 may be configured so as to perform transmission processing for the third and subsequent Ethernet frames.

Yet still further, although the switch device according to the first embodiment of the present disclosure is configured so as to be equipped with the first semiconductor integrated circuit 51 and the second semiconductor integrated circuit 52, the configuration is not limited to this. The switch device 101 may be configured so as to be equipped with one semiconductor integrated circuit integrally provided with the respective functions of the first semiconductor integrated circuit 51 and the second semiconductor integrated circuit 52 or may be configured so as to be equipped with three or more semiconductor integrated circuits in which the respective functions of the first semiconductor integrated circuit 51 and the second semiconductor integrated circuit 52 are divided and provided.

The in-vehicle network described in Patent Document 1 is provided with the communication gateway for relaying information transmitted from the in-vehicle communication devices.

For example, as a configuration of the communication gateway, a configuration equipped with an L2 switch for performing layer 2 relay processing and an MCU for performing layer 3 relay processing is conceivable.

In this configuration, for example, in the case that the speed of the L2 switch is raised, the transmission of frames to be relayed at the L2 level is performed at high speed. However, in the case that the speed of the MPU is not raised, the transmission of IP packets to be relayed at the L3 level is not performed at high speed, whereby the benefit of the high speed at the L2 level cannot be enjoyed in IP communication between an external device outside the vehicle and an in-vehicle device.

On the other hand, the switch device according to the first embodiment of the present disclosure relays the flow data in the in-vehicle network 12. The acquiring section thereof acquires correspondence information indicating at least the correspondence relationship among a transmission destination IP address, a transmission source IP address, transmission destination port information, transmission source port information and a transmission destination MAC address. And then, the relay section 22 acquires the transmission destination MAC address from the correspondence information on the basis of the transmission destination IP address, the transmission source IP address, the transmission destination port information and the transmission source port information included in an Ethernet frame that is received by the switch device 101 incorporating the relay section 22 and constitutes the flow data, and then the relay section 22 performs transmission processing to transmit the Ethernet frame including the acquired transmission destination MAC address.

With this configuration, the transmission destination MAC address can be acquired from the correspondence information more quickly than, for example, in the case that the subnet at the transmission destination of an IP packet is specified and that the transmission destination MAC address to be included in an Ethernet frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

Furthermore, the switch device according to the first embodiment of the present disclosure relays the flow data in the in-vehicle network 12. The acquiring section acquires correspondence information indicating at least the correspondence relationship between a transmission destination MAC address and a value uniquely determining the transmission destination IP address, the transmission source IP address, the transmission destination port information and the transmission source port information. After that, the relay section 22 acquires, from the correspondence information, the transmission destination MAC address corresponding to a value, which is included in an Ethernet frame that is received by the switch device 101 incorporating the relay section 22 and constitutes the flow data and which uniquely determines the transmission destination IP address, the transmission source IP address, the transmission destination port information and the transmission source port information of the Ethernet frame, and then the relay section 22 performs transmission processing to transmit the Ethernet frame including the acquired transmission destination MAC address.

As described above, with the configuration in which a value uniquely determining the transmission destination IP address, the transmission source IP address, the transmission destination port information and the transmission source port information is used, the correspondence information can be simplified. Furthermore, the transmission destination MAC address can be acquired from the correspondence information more quickly than, for example, in the case that the subnet at the transmission destination of an IP packet is specified and that the transmission destination MAC address to be included in an Ethernet frame is acquired from the correspondence table of the IP addresses and the MAC addresses in the specified subnet, whereby layer 3 relay processing can be performed at high speed. Hence, IP packet relay processing in the in-vehicle network can be performed efficiently. Consequently, IP communication between the external device and the in-vehicle device 111 can be performed at high speed.

Moreover, in the switch device according to the first embodiment of the present disclosure, the storage section 23 fixedly stores the correspondence information.

For example, in an environment in which the network configuration of the switch device 101 and the in-vehicle devices 111 is fixed as described above, with the configuration in which the correspondence information indicating the predetermined correspondence relationship is fixedly stored, the transmission destination MAC address to be included in an Ethernet frame can be acquired more efficiently than in a configuration in which the correspondence relationship is dynamically created each time an Ethernet frame is received. Still further, since the overlap of values uniquely determining the transmission destination IP address, the transmission source IP address, the transmission destination port information and the transmission source port information can be checked preliminarily, appropriate correspondence information having no overlap in the values can be prepared.

Furthermore, in the switch device according to the first embodiment of the present disclosure, the inspection section 44 performs inspection processing for the Ethernet frames received by the switch device 101 incorporating the inspection section 44. In the case that the first Ethernet frame constituting the flow data has passed the inspection processing, the inspection section 44 does not perform the inspection processing for the second and subsequent Ethernet frames. And then, the relay section 22 performs the transmission processing for at least the second and subsequent Ethernet frames.

With this configuration, security is ensured for the first frame, and the inspection processing is omitted for the second and subsequent frames in which security can be ensured, and then the transmission processing is performed, whereby layer 3 relay processing can be performed at high speed.

Moreover, in the switch device according to the first embodiment of the present disclosure, the switching section 24 switches whether the Ethernet frames received by the switch device 101 incorporating the switching section 24 are output to the inspection section 44 or to the relay section 22. And then, the switching section 24 outputs the first frame to the inspection section 44, and in the case that the first Ethernet frame has passed the inspection processing, the switching section 24 outputs the second and subsequent Ethernet frames to the relay section 22.

With this configuration, the received frames can be transmitted appropriately to one of the inspection section 44 and the relay section 22 according to the order of the frames in the flow data and the inspection results of the frames.

Furthermore, the switch device according to the first embodiment of the present disclosure is equipped with the first semiconductor integrated circuit 51 and the second semiconductor integrated circuit 52. The first semiconductor integrated circuit 51 includes the inspection section 44. Moreover, the second semiconductor integrated circuit 52 includes the relay section 22 and the switching section 24 and receives the Ethernet frames from the outside and transmits the Ethernet frames to the outside.

With this configuration, processing loads can be prevented from being concentrated on the first semiconductor integrated circuit 51 that is, for example, formed of an MPU. What's more, for example, even in the case that the speed of the second semiconductor integrated circuit 52 serving as an L2 switch is raised without raising the speed of the first semiconductor integrated circuit 51, most of L3 level processing can be performed in the second semiconductor integrated circuit 52, whereby IP communication between the external device and the in-vehicle device 111 can be performed at high speed while suppressing the cost increase for raising the speed of the MPU.

Still further, in the switch device according to the first embodiment of the present disclosure, the correspondence information indicates the correspondence relationship among the transmission destination IP address, the transmission source IP address, the transmission destination port information, the transmission source port information, the communication protocol and the transmission destination MAC address.

With this configuration, it is possible to distinguish types of flow data being identical in the transmission destination IP address, the transmission source IP address, the transmission destination port information and the transmission source port information but different in the communication protocol, whereby flow data relay processing can be managed meticulously.

Furthermore, in the switch device according to the first embodiment of the present disclosure, the value is a value uniquely determining the transmission destination IP address, the transmission source IP address, the transmission destination port information, the transmission source port information and the communication protocol.

With this configuration, it is possible to distinguish types of flow data being identical in the transmission destination IP address, the transmission source IP address, the transmission destination port information and the transmission source port information but different in the communication protocol, whereby flow data relay processing can be managed meticulously.

Next, another embodiment of the present disclosure will be described below referring to the drawings. The same or equivalent components in the drawings are designated by the same reference numerals and signs, and the descriptions thereof are not repeated.

Second Embodiment

This embodiment relates to a switch device in which the relay section thereof is provided in the first semiconductor integrated circuit in comparison with the switch device according to the first embodiment. The switch device according to this embodiment is similar to the switch device according to the first embodiment except for the contents described below.

Figure 17:
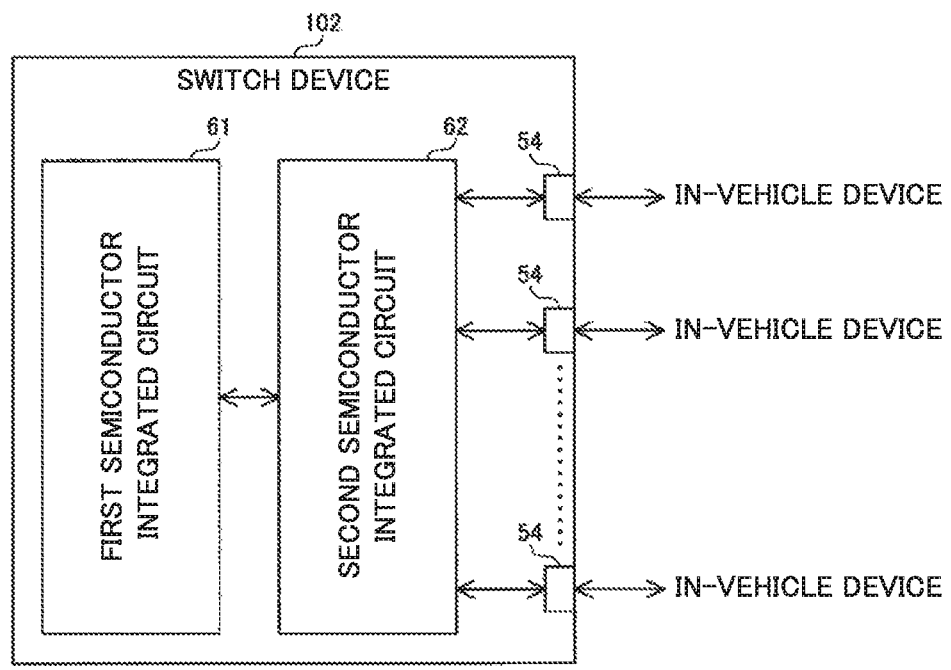
FIG. 17 is a view showing a configuration of a switch device in an in-vehicle communication system according to a second embodiment of the present disclosure.

FIG. 17 is a view showing a configuration of a switch device in an in-vehicle communication system according to the second embodiment of the present disclosure.

Referring to FIG. 17, a switch device 102 is equipped with a first semiconductor integrated circuit 61, the second semiconductor integrated circuit 62 and the plurality of communication ports 54.

The operations of the communication ports 54 and the second semiconductor integrated circuit 62 in the switch device 012 are similar to those of the communication ports 54 and the second semiconductor integrated circuit 62 in the switch device 901 shown in FIG. 13, respectively.

Figure 18:
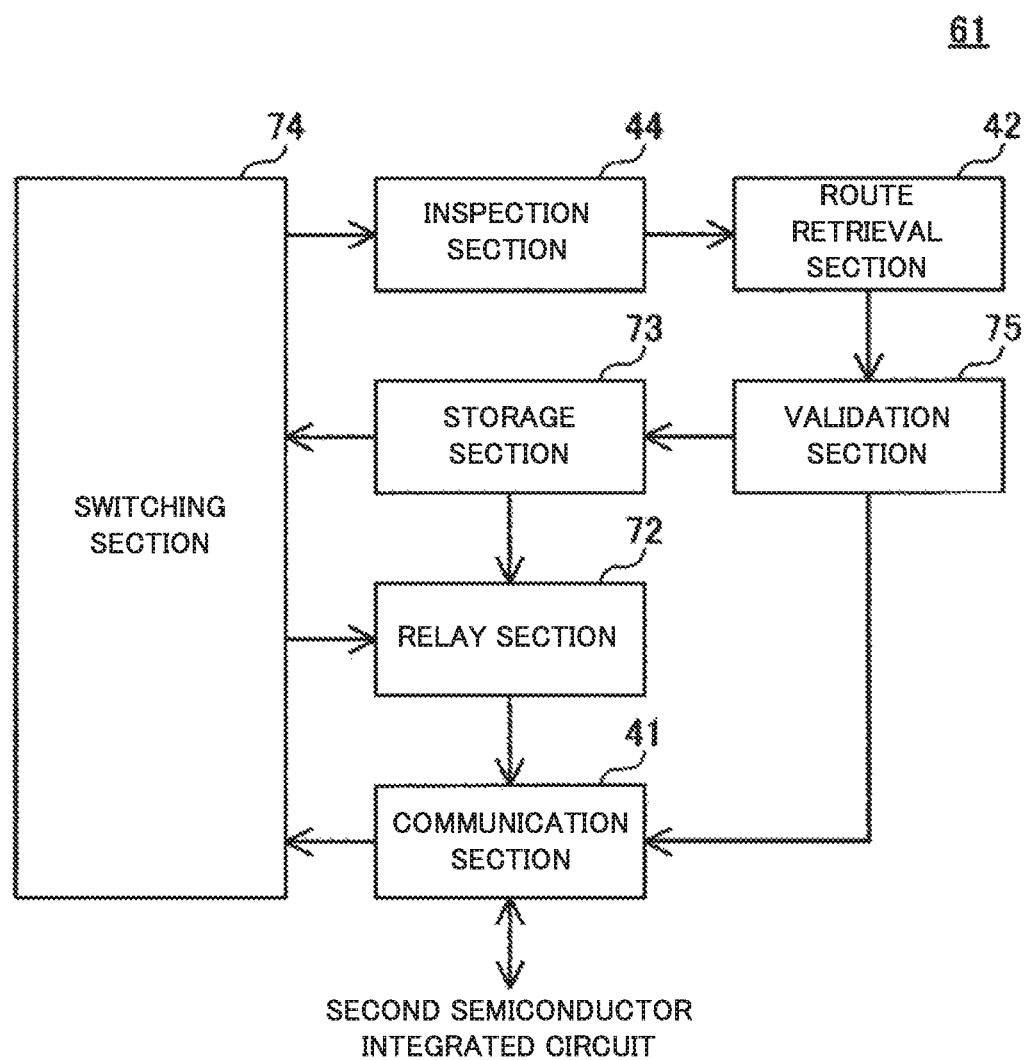
FIG. 18 is a view showing a configuration of a first semiconductor integrated circuit in the switch device according to the second embodiment of the present disclosure.

FIG. 18 is a view showing a configuration of the first semiconductor integrated circuit in the switch device according to the second embodiment of the present disclosure.

Referring to FIG. 18, the first semiconductor integrated circuit 61 includes the communication section 41, the route retrieval section 42, the inspection section 44, a relay section 72, the storage section 73, a switching section 74 and a validation section 75.

The operations of the communication section 41, the route retrieval section 42 and the inspection section 44 in the first semiconductor integrated circuit 61 are similar to those of the communication section 41, the route retrieval section 42 and the inspection section 44 in the first semiconductor integrated circuit 51 shown in FIG. 6.

FIG. 19 is a view showing an example of a conversion table stored in the storage section in the switch device according to the second embodiment of the present disclosure.

Referring to FIG. 19, the storage section 73 in the first semiconductor integrated circuit 61 fixedly stores a conversion table Tab 4 serving as an example of the correspondence information.

The conversion table Tab 4 indicates, for example, the correspondence relationship among a transmission destination IP address, a transmission source IP address, a communication protocol, a transmission destination port number, a transmission source port number, a transmission destination MAC address, a transmission source MAC address and a state. The state herein indicates valid or invalid, and indicates invalid by default.

The conversion table Tab 4, for example, includes all the combinations of the transmission destination IP address, the transmission source IP address, the communication protocol, the transmission destination port number and the transmission source port number capable of being subjected to L3 relay processing in the in-vehicle network 12.

Referring again to FIG. 18, the switching section 74 switches whether Ethernet frames received by the switch device 102 incorporating the switching section 74 are output to the inspection section 44 or to the relay section 72. And then, the switching section 74, for example, outputs the first Ethernet frame to the inspection section 44, and in the case that the first Ethernet frame has passed the inspection processing, the switching section 74 outputs the second and subsequent frames to the relay section 72.

(Processing of the First Ethernet Frame)

Upon receiving the first Ethernet frame required to be subjected to the relay processing at the L3 level from the second semiconductor integrated circuit 62 via the communication section 41, the switching section 74 confirms the contents of the IP packet included in the received Ethernet frame. More specifically, the switching section 74 confirms the transmission destination IP address, the transmission source IP address, the communication protocol, the transmission destination port number and the transmission source port number.

And then, the switching section 74 refers to the conversion table Tab 4 and confirms the state corresponding to the confirmed transmission destination IP address, transmission source IP address, communication protocol, transmission destination port number and transmission source port number.

In the case that the confirmed state is "invalid", the switching section 74 determines that the Ethernet frame received from the second semiconductor integrated circuit 62 is the first Ethernet frame and outputs the Ethernet frame to the inspection section 44.

Upon receiving the Ethernet frame from the switching section 74, the inspection section 44 performs inspection processing for the IP packet included in the received Ethernet frame, and in the case that the inspection section 44 has found an abnormality, the inspection section 44 discards the Ethernet frame including the IP packet.

On the other hand, in the case that the inspection section 44 finds no abnormality, the inspection section 44 outputs the Ethernet frame including the IP packet to the route retrieval section 42.

Upon receiving the Ethernet frame from the inspection section 44, the route retrieval section 42 reduces the TTL value stored in the header of the IP packet included in the received Ethernet frame by one and then performs the following processing.

In other words, the route retrieval section 42 acquires the transmission destination IP address from the IP packet and performs a subnet mask calculation for the acquired transmission destination IP address, thereby specifying a destination network.

The route retrieval section 42 refers to the routing table and specifies the transmission interface corresponding to the specified destination network.

And then, the route retrieval section 42 refers to the ARP table corresponding to the specified transmission interface and acquires the MAC address, i.e., the retrieval address, corresponding to the transmission destination IP address from the ARP table.

The route retrieval section 42 rewrites the transmission destination MAC address and the transmission source MAC address of the Ethernet frame to the retrieval address and the switch address, respectively, and outputs the Ethernet frame to the validation section 75.

The validation section 75, for example, validates the state included in the conversion table Tab 4 stored in the storage section 73 and corresponding to the Ethernet frame from the route retrieval section 42

In more detail, upon receiving the Ethernet frame from the route retrieval section 42, the validation section 75 confirms the transmission destination IP address, the transmission source IP address, the communication protocol, the transmission destination port number and the transmission source port number included in the received Ethernet frame.

The validation section 75 rewrites the state corresponding to the confirmed transmission destination IP address, transmission source IP address, communication protocol, transmission destination port number and transmission source port number in the conversion table Tab 3 stored in the storage section 73 from "invalid" to "valid".

And then, the validation section 75 transmits the Ethernet frame to the second semiconductor integrated circuit 62 via the communication section 41.

Furthermore, the validation section 75, for example, monitors the communication section 41, and in the case that the corresponding Ethernet frame is not transmitted from the communication section 41 until a predetermined time elapses after the rewriting of the state in the conversion table Tab 4 to "valid", the validation section 75 rewrites the state from "valid" to "invalid".

Referring again to FIG. 14, upon receiving an Ethernet frame from the first semiconductor integrated circuit 61 via the communication section 21, the transfer destination determination section 26 in the second semiconductor integrated circuit 62 confirms the transmission destination MAC address included in the MAC header in the received Ethernet frame.

The transfer destination determination section 26 refers to the ARL table Tab 1 and acquires the output destination corresponding to the confirmed transmission destination MAC address, i.e., the retrieval address, from the ARL table Tab 1.

In this case, the switching section 24, for example, acquires one of the logic port numbers 0 to 6 from the ARL table Tab 1 as the output destination and transmits the Ethernet frame to the destination in-vehicle device 111 via the port section 25 corresponding to the acquired logic port number.

(Processing of the Second and Subsequent Ethernet Frames)

Referring again to FIG. 18, upon receiving the second or subsequent Ethernet frame required to be subjected to the relay processing at the L3 level from the second semiconductor integrated circuit 62 via the communication section 41, the switching section 74 confirms the transmission destination IP address, the transmission source IP address, the communication protocol, the transmission destination port number, the transmission source port number included in the received Ethernet frame.

And then, the switching section 74 refers to the conversion table Tab 4 and confirms the state corresponding to the confirmed transmission destination IP address, transmission source IP address, communication protocol, transmission destination port number and transmission source port number.

In the case that the confirmed state is "valid", the switching section 74 determines that the Ethernet frame received from the second semiconductor integrated circuit 62 is the second or subsequent Ethernet frame and outputs the Ethernet frame to the relay section 72.

The relay section 72 acquires the transmission destination MAC address from the correspondence information on the basis of the transmission destination IP address, the transmission source IP address, the communication protocol, the transmission destination port information and the transmission source port information included in the Ethernet frame that is received by the switch device 101 incorporating the relay section 72 and constitutes the flow data.

And then, the relay section 72 performs transmission processing to transmit the Ethernet frame including the acquired transmission destination MAC address. In detail, the relay section 72, for example, performs transmission processing for the second or subsequent Ethernet frame.

In more detail, upon receiving the second or subsequent Ethernet frame from the switching section 74, the relay section 72 confirms the contents of the IP packet included in the received Ethernet frame. More specifically, the relay section 72 confirms the transmission destination IP address, the transmission source IP address, the communication protocol, the transmission destination port number and the transmission source port number.

After that, the relay section 72 refers to the conversion table Tab 4 and acquires the transmission destination MAC address and the transmission source MAC address corresponding to the confirmed transmission destination IP address, transmission source IP address, communication protocol, transmission destination port number and transmission source port number from the conversion table Tab 4.

The transmission destination MAC address and the transmission source MAC address are herein the retrieval address and the switch address, respectively.

The relay section 72 rewrites the transmission destination MAC address and the transmission source MAC address of the Ethernet frame to the acquired retrieval address and switch address, respectively, and transmits the Ethernet frame to the second semiconductor integrated circuit 62 via the communication section 41.

Referring again to FIG. 14, upon receiving an Ethernet frame from the first semiconductor integrated circuit 61 via the communication section 21, the transfer destination determination section 26 in the second semiconductor integrated circuit 62 confirms the transmission destination MAC address included in the MAC header in the received Ethernet frame.

The transfer destination determination section 26 refers to the ARL table Tab 1 and acquires the output destination corresponding to the confirmed transmission source MAC address from the ARL table Tab 1.

In this case, the switching section 24 acquires the same logic port number as the output destination from the ARL table Tab 1 as in the case of the above-mentioned first Ethernet frame and transmits the Ethernet frame to the destination in-vehicle device 111 via the port section 25 corresponding to the acquired logic port number.

Modification Example of the Switch Device 102

Figure 20:
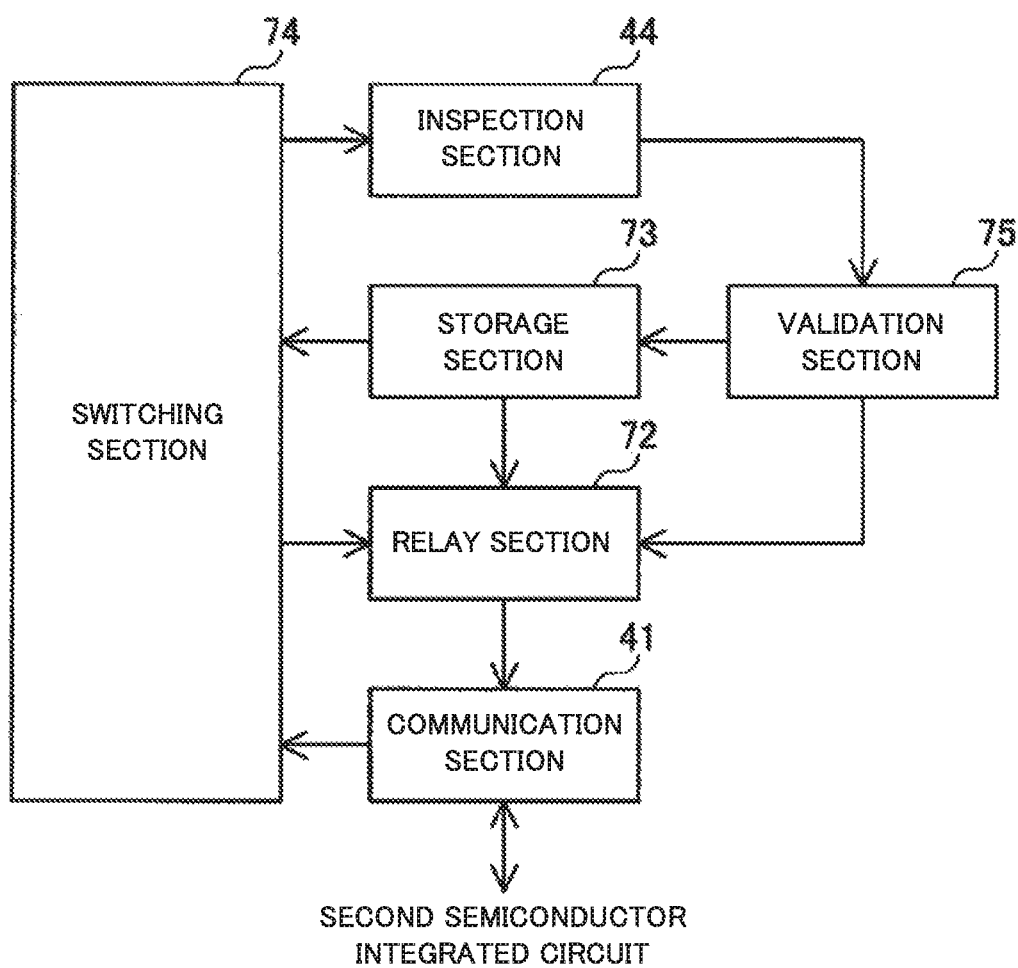
FIG. 20 is a view showing a configuration of a modification example of the first semiconductor integrated circuit according to the second embodiment of the present disclosure.

FIG. 20 is a view showing a configuration of a modification example of the first semiconductor integrated circuit according to the second embodiment of the present disclosure.

Referring to FIG. 20, the modification example of the first semiconductor integrated circuit 61 does not include the route retrieval section 42 in comparison with the first semiconductor integrated circuit 61 shown in FIG. 18.

The operations of the communication section 41, the inspection section 44, the relay section 72, the storage section 73, the switching section 74 and the validation section 75 in the modification example of the first semiconductor integrated circuit 61 are similar to those of the communication section 41, the inspection section 44, the relay section 72, the storage section 73, the switching section 74 and the validation section 75 in the first semiconductor integrated circuit 61 shown in FIG. 18.

FIG. 21 is a view showing an example of a conversion table stored in the storage section in the modification example of the switch device according to the second embodiment of the present disclosure.

Referring to FIG. 21, the storage section 73 fixedly stores a conversion table Tab 5 serving as an example of the correspondence information.

The conversion table Tab 5 indicates, for example, the correspondence relationship among a hash value, a transmission destination MAC address, a transmission source MAC address and a state. The state herein indicates valid or invalid, and indicates invalid by default.

The hash value is a value generated using the calculation procedure P1 by using the transmission destination IP address, the transmission source IP address, the communication protocol, the transmission destination port number and the transmission source port number as retrieval keys.

The conversion table Tab 5, for example, includes the hash values for all the combinations of the transmission destination IP address, the transmission source IP address, the communication protocol, the transmission destination port number and the transmission source port number capable of being subjected to L3 relay processing in the in-vehicle network 12.

Furthermore, the hash values in the conversion table Tab 5 have been preliminarily checked so as not to overlap. For example, in the case that overlapping hash values are present, new hash values are generated using other calculation procedures so that the hash values in the conversion table Tab 5 do not overlap.

(Processing of the First Ethernet Frame)

Referring again to FIG. 20, upon receiving the first Ethernet frame required to be subjected to the relay processing at the L3 level from the second semiconductor integrated circuit 62 via the communication section 41, the switching section 74 acquires the transmission destination IP address, the transmission source IP address, the communication protocol, the transmission destination port number and the transmission source port number from the received Ethernet frame.

The switching section 74 generates a hash value using the calculation procedure P1 by using the acquired transmission destination IP address, transmission source IP address, communication protocol, transmission destination port number and transmission source port number as retrieval keys.

And then, the switching section 74 refers to the conversion table Tab 5 and confirms the state corresponding to the hash value.

In the case that the confirmed state is "invalid", the switching section 74 determines that the Ethernet frame received from the second semiconductor integrated circuit 62 is the first Ethernet frame, attaches the generated hash value to the Ethernet frame and outputs the Ethernet frame to the inspection section 44.

Upon receiving the Ethernet frame from the switching section 74, the inspection section 44 performs inspection processing for the IP packet included in the received Ethernet frame, and in the case that the inspection section 44 has found an abnormality, the inspection section 44 discards the Ethernet frame including the IP packet.

On the other hand, in the case that the inspection section 44 finds no abnormality, the inspection section 44 outputs the Ethernet frame including the IP packet to the validation section 75.

Upon receiving the Ethernet frame from the inspection section 44, the validation section 75 acquires the hash value attached to the received Ethernet frame.

The validation section 75 rewrites the state corresponding to the acquired hash value from "invalid" to "valid" in the conversion table Tab 5 stored in the storage section 73. And then the validation section 75 outputs the Ethernet frame to the relay section 22.

Upon receiving the Ethernet frame from the validation section 75, the relay section 72 acquires the hash value attached to the received Ethernet frame.

After that, the relay section 72 refers to the conversion table Tab 5 and confirms that the state corresponding to the acquired hash value is "valid", and then acquires the transmission destination MAC address and the transmission source MAC address corresponding to the hash value from the conversion table Tab 5.

The transmission destination MAC address and the transmission source MAC address are herein, for example, the above-mentioned retrieval address and switch address, respectively.

The relay section 72 rewrites the transmission destination MAC address and the transmission source MAC address of the Ethernet frame to the acquired retrieval address and switch address, respectively, and discards the hash value attached to the Ethernet frame, and then transmits the Ethernet frame to the second semiconductor integrated circuit 62 via the communication section 41.

(Processing of the Second and Subsequent Ethernet Frames)

Upon receiving the second or subsequent Ethernet frame required to be subjected to the relay processing at the L3 level from the second semiconductor integrated circuit 62 via the communication section 41, the switching section 74 acquires the transmission destination IP address, the transmission source IP address, the communication protocol, the transmission destination port number and the transmission source port number from the received Ethernet frame.

The switching section 74 generates a hash value using the calculation procedure P1 by using the acquired transmission destination IP address, transmission source IP address, communication protocol, transmission destination port number and transmission source port number as retrieval keys.

And then, the switching section 74 refers to the conversion table Tab 5 and confirms the state corresponding to the hash value.

In the case that the confirmed state is "valid", the switching section 74 determines that the Ethernet frame received from the second semiconductor integrated circuit 62 is the second or subsequent Ethernet frame, attaches the generated hash value to the Ethernet frame and outputs the Ethernet frame to the relay section 72.

Upon receiving the Ethernet frame from the switching section 74, the relay section 72 acquires the hash value attached to the received Ethernet frame.

After that, the relay section 72 refers to the conversion table Tab 5 and confirms that the state corresponding to the acquired hash value is "valid", and then acquires the transmission destination MAC address and the transmission source MAC address corresponding to the hash value from the conversion table Tab 5.

The transmission destination MAC address and the transmission source MAC address are herein, for example, the retrieval address and the switch address, respectively.

The relay section 72 rewrites the transmission destination MAC address and the transmission source MAC address of the Ethernet frame to the acquired retrieval address and switch address, respectively, and discards the hash value attached to the Ethernet frame, and then transmits the Ethernet frame to the second semiconductor integrated circuit 62 via the communication section 41.

In the switch device according to the second embodiment of the present disclosure, although the storage section 73 is configured so as to be provided inside the first semiconductor integrated circuit 61, the configuration is not limited to this. The storage section 73 may be configured so as to be provided outside the first semiconductor integrated circuit 61.

Still further, although the switch device according to the second embodiment of the present disclosure is configured so as to be equipped with the first semiconductor integrated circuit 61 and the second semiconductor integrated circuit 62, the configuration is not limited to this. The switch device 102 may be configured so as to be equipped with one semiconductor integrated circuit integrally provided with the respective functions of the first semiconductor integrated circuit 61 and the second semiconductor integrated circuit 62 or may be configured so as to be equipped with three or more semiconductor integrated circuits in which the respective functions of the first semiconductor integrated circuit 61 and the second semiconductor integrated circuit 62 are divided and provided.

As described above, the switch device according to the second embodiment of the present disclosure is equipped with the first semiconductor integrated circuit 61 and the second semiconductor integrated circuit 62. The first semiconductor integrated circuit 61 includes the inspection section 44, the relay section 72 and the switching section 74. Furthermore, the second semiconductor integrated circuit 62 receives the Ethernet frames from the outside and transmits the Ethernet frames to the outside.

With the above-mentioned configuration, L3 level processing, for example, can be performed concentratedly on the first semiconductor integrated circuit 61 that is, for example, formed of an MPU, and the processing performed in the second semiconductor integrated circuit 62 can be limited to L2 level processing, whereby a commercially available L2 switch integrated circuit can be directly used as the second semiconductor integrated circuit 62. Hence, IP communication between the external device and the in-vehicle device 111 can be performed at high speed while suppressing the cost increase for the L2 switch. Furthermore, unlike the switch device 901, the switch device according to this embodiment does not dynamically manage the flow list Lst 1, whereby L3 relay processing can be more simplified than in the switch device 901.

Since the other configurations and operations are similar to those in the in-vehicle communication system according to the first embodiment, the detailed descriptions thereof are not repeated.

Some or all of the components and operations of the respective devices according to the first embodiment and the second embodiment of the present disclosure can be combined appropriately.

It is assumed that the above-mentioned embodiments are merely examples in all respects and not to be understood as limiting. The scope of the present disclosure is not defined by the above description, but by the appended claims, and includes all the changes within the meanings and ranges equivalent to the claims.

The above-mentioned description includes the features appended in the following supplementary notes.

Supplementary Note 1

A switch device for relaying flow data in an in-vehicle network, being equipped with:

an acquiring section for acquiring correspondence information indicating at least the correspondence relationship among a transmission destination IP (Internet Protocol) address, a transmission source IP address, transmission destination port information, transmission source port information and a transmission destination MAC (Media Access Control) address and a relay section for acquiring the transmission destination MAC address from the correspondence information on the basis of the transmission destination IP address, the transmission source IP address, the transmission destination port information and the transmission source port information included in a frame that is received by the switch device and constitutes the flow data and for performing transmission processing to transmit the frame including the acquired transmission destination MAC address, wherein the flow data is composed of a plurality of IP packets each including a piece of divided data, the frame is an Ethernet frame and includes the transmission destination MAC address and one of the IP packets, the IP packet includes the transmission destination IP address, the transmission source IP address and one TCP packet or one UDP packet, and the TCP packet or the UDP packet includes the transmission destination port information, the transmission source port information and part of the data.

Supplementary Note 2

A switch device for relaying flow data in an in-vehicle network, being equipped with:

an acquiring section for acquiring correspondence information indicating at least the correspondence relationship between a transmission destination MAC address and a value uniquely determining a transmission destination IP address, a transmission source IP address, transmission destination port information and transmission source port information and a relay section for acquiring, from the correspondence information, the transmission source MAC address corresponding to a value, which is included in a frame that is received by the switch device and constitutes the flow data and which uniquely determines the transmission destination IP address, the transmission source IP address, the transmission destination port information and the transmission source port information of the frame, and for performing transmission processing to transmit the frame including the acquired transmission destination MAC address, wherein the flow data is composed of a plurality of IP packets each including a piece of divided data, the frame is an Ethernet frame and includes the transmission destination MAC address and one of the IP packets, the IP packet includes the transmission destination IP address, the transmission source IP address and one TCP packet or one UDP packet, the TCP packet or the UDP packet includes the transmission destination port information, the transmission source port information and part of the data, and the value is a hash value generated using a predetermined calculation procedure by using the transmission destination IP address, the transmission source IP address, the transmission destination port number and the transmission source port number as retrieval keys.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A switch device for relaying flow data in an in-vehicle network in which connection topology and IP addresses are fixedly operated, the flow data being constituted by a frame includes a L2 frame that can be relayed at L2 level and a L3 frame that requires relaying at L3 level, comprising:
   an acquiring section for acquiring correspondence information indicating at least a correspondence relationship among a transmission destination IP (Internet Protocol) address, a transmission source IP address, transmission destination port information, transmission source port information and a transmission destination MAC (Media Access Control) address, the correspondence relationship being fixedly determined in advance, and
   a relay section for acquiring the transmission destination MAC address from the correspondence information on the basis of the transmission destination IP address, the transmission source IP address, the transmission destination port information and the transmission source port information included in the L3 frame that is received by the switch device and for performing relay processing at L3 level to transmit the L3 frame including the acquired transmission destination MAC address, wherein
   the switch device further comprises
   a storage section for storing the correspondence information indicating the correspondence relationship fixedly determined in advance, as information that is not updated in processing of the flow data,
   an inspection section for performing inspection processing for determining whether to transmit or discard the L3 frames received by the switch device, and
   a switching section for transmitting the L2 frame received by the switch device to outside, and for switching whether the L3 frames received by the switch device are output to the inspection section or to the relay section, wherein
   the switching section transmits the L2 frame to the outside without checking the IP address, and among the L3 frames, outputs the first L3 frame to the inspection section, and outputs the second and subsequent L3 frames to the relay section,
   in a case that the first L3 frame constituting the flow data has been determined to be a transmission target by the inspection processing, the inspection section does not perform the inspection processing for the second and subsequent L3 frames, and
   the relay section performs the relay processing at L3 level for at least the second and subsequent L3 frames.

2. A switch device for relaying flow data in an in-vehicle network in which connection topology and IP addresses are fixedly operated, the flow data being constituted by a frame includes a L2 frame that can be relayed at L2 level and a L3 frame that requires relaying at L3 level, comprising:
   an acquiring section for acquiring correspondence information indicating at least a correspondence relationship between a transmission destination MAC address and a value uniquely determining a transmission destination IP address, a transmission source IP address, transmission destination port information and transmission source port information, the correspondence relationship being fixedly determined in advance, and
   a relay section for acquiring, from the correspondence information, the transmission destination MAC address corresponding to the value, which is included in the L3 frame that is received by the switch device and which uniquely determines the transmission destination IP address, the transmission source IP address, the transmission destination port information and the transmission source port information of the L3 frame, and for performing relay processing at L3 level to transmit the L3 frame including the acquired transmission destination MAC address, wherein
   the switch device further comprises
   a storage section for storing the correspondence information indicating the correspondence relationship fixedly determined in advance, as information that is not updated in processing of the flow data,
   an inspection section for performing inspection processing for determining whether to transmit or discard the L3 frames received by the switch device, and
   a switching section for transmitting the L2 frame received by the switch device to outside, and for switching whether the L3 frames received by the switch device are output to the inspection section or to the relay section, wherein
   the switching section transmits the L2 frame to the outside without checking the IP address, and among the L3 frames, outputs the first L3 frame to the inspection section, and outputs the second and subsequent L3 frames to the relay section,
   in a case that the first L3 frame constituting the flow data has been determined to be a transmission target by the inspection processing, the inspection section does not perform the inspection processing for the second and subsequent L3 frames, and
   the relay section performs the relay processing at L3 level for at least the second and subsequent L3 frames.

3. The switch device according to claim 1, further comprising:
   a first semiconductor integrated circuit and a second semiconductor integrated circuit, wherein
   the first semiconductor integrated circuit includes the inspection section, and
   the second semiconductor integrated circuit includes the relay section and the switching section and receives the frames from an outside and transmits the frames to the outside.

4. The switch device according to claim 2, further comprising:
   a first semiconductor integrated circuit and a second semiconductor integrated circuit, wherein
   the first semiconductor integrated circuit includes the inspection section, and
   the second semiconductor integrated circuit includes the relay section and the switching section and receives the frames from an outside and transmits the frames to the outside.

5. The switch device according to claim 1, further comprising:
   a first semiconductor integrated circuit and a second semiconductor integrated circuit, wherein
   the first semiconductor integrated circuit includes the inspection section, the relay section and the switching section, and
   the second semiconductor integrated circuit receives the frames from an outside and transmits the frames to the outside.

6. The switch device according to claim 2, further comprising:
   a first semiconductor integrated circuit and a second semiconductor integrated circuit, wherein the first semiconductor integrated circuit includes the inspection section, the relay section and the switching section, and the second semiconductor integrated circuit receives the frames from an outside and transmits the frames to the outside.

7. The switch device according to claim 1, wherein the correspondence information indicates the correspondence relationship among the transmission destination IP address, the transmission source IP address, the transmission destination port information, the transmission source port information, a communication protocol and the transmission destination MAC address.

8. The switch device according to claim 2, wherein the value is a value uniquely determining the transmission destination IP address, the transmission source IP address, the transmission destination port information, the transmission source port information and a communication protocol.

9. A communication control method in a switch device for relaying flow data in an in-vehicle network in which connection topology and IP addresses are fixedly operated, the flow data being constituted by a frame includes a L2 frame that can be relayed at L2 level and a L3 frame that requires relaying at L3 level, comprising:

a step of acquiring correspondence information indicating at least a correspondence relationship among a transmission destination IP address, a transmission source IP address, transmission destination port information, transmission source port information and a transmission destination MAC address, the correspondence relationship being fixedly determined in advance, and a step of acquiring the transmission destination MAC address from the correspondence information on the basis of the transmission destination IP address, the transmission source IP address, the transmission destination port information and the transmission source port information included in the L3 frame that is received by the switch device and then performing relay processing at L3 level to transmit the L3 frame including the acquired transmission destination MAC address, wherein the switch device comprises a storage section for storing the correspondence information indicating the correspondence relationship fixedly determined in advance, as information that is not updated in processing of the flow data, and the communication control method further comprises a step of performing inspection processing for determining whether to submit or discard the L3 frames received by the switch device, and a step of performing transmitting the L2 frame received by the switch device to outside, and of performing switching whether the L3 frames received by the switch device are output to the inspection section or to the relay section, wherein in the step of performing transmitting and switching, transmitting the L2 frame to the outside without checking the IP address is performed, and among the L3 frames, determining the first L3 frame to be a target for the inspection processing is performed, and determining the second and subsequent L3 frames to be a target for the relay processing is performed, in the step of performing inspection processing, in a case that the first L3 frame constituting the flow data has been determined to be a transmission target by the inspection processing, the inspection processing for the second and subsequent L3 frames is not performed, and in the step of performing relay processing, the relay processing at L3 level for at least the second and subsequent L3 frames is performed.

10. A communication control method in a switch device for relaying flow data in an in-vehicle network in which connection topology and IP addresses are fixedly operated, the flow data being constituted by a frame includes a L2 frame that can be relayed at L2 level and a L3 frame that requires relaying at L3 level, comprising:

a step of acquiring correspondence information indicating at least a correspondence relationship between a transmission destination MAC address and a value uniquely determining a transmission destination IP address, a transmission source IP address, transmission destination port information and transmission source port information, the correspondence relationship being fixedly determined in advance, and a step of acquiring, from the correspondence information, the transmission destination MAC address corresponding to the value, which is included in the L3 frame that is received by the switch device and which uniquely determines the transmission destination IP address, the transmission source IP address, the transmission destination port information and the transmission source port information of the L3 frame, and then performing relay processing at L3 level to transmit the L3 frame including the acquired transmission destination MAC address, wherein the switch device comprises a storage section for storing the correspondence information indicating the correspondence relationship fixedly determined in advance, as information that is not updated in processing of the flow data, and the communication control method further comprises a step of performing inspection processing for determining whether to submit or discard the L3 frames received by the switch device, and a step of performing transmitting the L2 frame received by the switch device to outside, and of switching whether the L3 frames received by the switch device are output to the inspection section or to the relay section, wherein in the step of performing transmitting and switching, transmitting the L2 frame to the outside without checking the IP address is performed, and among the L3 frames, determining the first L3 frame to be a target for the inspection processing is performed, and determining the second and subsequent L3 frames to be a target for the relay processing is performed, in the step of performing inspection processing, in a case that the first L3 frame constituting the flow data has been determined to be a transmission target by the inspection processing, the inspection processing for the second and subsequent L3 frames is not performed, and in the step of performing relay processing, the relay processing at L3 level for at least the second and subsequent L3 frames is performed.

* * * * *